United States Patent [19]
Kajiyama et al.

[11] Patent Number: 5,953,293
[45] Date of Patent: Sep. 14, 1999

[54] RECORDING AND/OR REPRODUCING APPARATUS FOR DISK-LIKE RECORDING MEDIUM

[75] Inventors: Yoshihiro Kajiyama, Chiba; Akihisa Inatani, Kanagawa, both of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/708,956

[22] Filed: Sep. 6, 1996

[30] Foreign Application Priority Data

Sep. 12, 1995 [JP] Japan ................................ 7-234499
Sep. 12, 1995 [JP] Japan ................................ 7-234502

[51] Int. Cl.$^6$ .................................................. G11B 17/22
[52] U.S. Cl. .............................................. 369/37; 369/36
[58] Field of Search ............................... 369/77.1, 77.2, 369/75.1, 75.2, 192, 36, 37, 38, 39

[56] References Cited

U.S. PATENT DOCUMENTS

| | | | |
|---|---|---|---|
| 4,580,254 | 4/1986 | Hojyo et al. | 369/39 |
| 4,750,160 | 6/1988 | Miller et al. | 369/37 |
| 5,067,116 | 11/1991 | Kadrmas | 369/37 |
| 5,214,628 | 5/1993 | Langman et al. | 369/37 |
| 5,644,558 | 7/1997 | Inatani et al. | 369/37 |
| 5,742,571 | 4/1998 | Hoshino et al. | 369/37 |

FOREIGN PATENT DOCUMENTS 59-231756  12/1984  Japan .
87/07423  12/1987  WIPO .

*Primary Examiner*—Jefferson Evans
*Assistant Examiner*—Tod Kupstas
*Attorney, Agent, or Firm*—Jay H. Maioli

[57] ABSTRACT

A disk recording and/or reproducing apparatus having a disk exchanging function includes a stocker portion, a rotary drive mechanism, a recording and/or reproducing mechanism and a conveying mechanism. The stocker portion stocks therein a plurality of disks lengthwise. The stocker portion includes a plurality of recess portions in which a plurality of disks are stocked. A plurality of recess portions are disposed radially. The recess portion has a substantially V-like cross section at its portion contacting with an outer peripheral edge portion of the disk. The rotary drive mechanism rotates the stocker portion. The recording and/or reproducing mechanism records and/or reproduces the disk. The conveying mechanism extracts a desired disk from the stocker portion rotated by the rotary drive mechanism, conveys the extracted desired disk to the recording and/or reproducing mechanism, extracts the disk from the recording and/or reproducing mechanism and conveys the disk to the stocker portion.

14 Claims, 17 Drawing Sheets

RECORDING AND/OR REPRODUCING APPARATUS FOR DISK-LIKE RECORDING MEDIUM

BACKGROUND

1. Field of the Invention

The present invention relates to a recording and/or reproducing apparatus for a disk-like recording medium. More particularly, this invention relates to a recording and/or reproducing apparatus for a disk-like recording medium for recording and/or reproducing a disk-like recording medium selectively extracted from a plurality of disk-like recording media.

2. Background of the Invention

Heretofore, there are available disk reproducing apparatus in which a plurality of disk-like recording media, e.g., 100 preformatted optical disks such as compact discs (CDs) are stocked and a desired optical disk is selected for reproducing an information signal such as a recorded musical sound signal. This disk reproducing apparatus includes a disk stocker apparatus in which 100 optical disks are stocked perpendicularly, a disk conveying mechanism and a disk reproducing mechanism. The disk conveying mechanism selectively extracts one optical disk from the 100 optical disks stocked in the disk stocker apparatus and conveys the selected optical disk. The disk reproducing apparatus reproduces the information signal recorded on the optical disk conveyed by this disk conveying mechanism.

The disk stocker apparatus of this disk reproducing apparatus includes a rotary table having 100 disk stocker portions in which 100 optical disks are stocked separately and a table driving mechanism for rotating this rotary table. The 100 disk stocker portion on the rotary table are radially arranged about the rotation center of this rotary table, and one optical disk is perpendicularly stocked in each disk stocker portion. Accordingly, 100 optical disks stocked in the disk stocker portion are arranged in a doughnut fashion.

The disk conveying mechanism for selectively extracting one optical disk from the 100 optical disks stocked in such disk stocker portion and conveying the selected optical disk includes first and second arms and a disk guide or the like. The first arm upwardly supports the optical disk and pushes the optical disk in the upper direction. The second arm holds the optical disk in cooperation with the first arm and moves the optical disk toward the disk reproducing mechanism side. The disk guide guides the optical disk conveyed by the first and second arms up to the loading position of the disk reproducing mechanism.

The optical disk conveyed by the disk conveying mechanism is chucked by a disk table and a chucking plate of the disk reproducing apparatus. The disk reproducing mechanism includes a disk rotary drive mechanism for rotating the chucked optical disk, an optical pickup for reproducing an information signal such as a musical sound signal recorded on the rotating optical disk, a pickup drive mechanism for moving the optical pickup in the radius direction of the optical pickup, etc.

A user selects an optical disk to be reproduced by such disk player by operating operation switches. Specifically, when a predetermined signal is inputted by the operation switch, a control apparatus outputs a predetermined control signal based on such input signal to initially rotate the rotary table to move the selected disk stocker portion on the conveying trajectory of the disk conveying mechanism. Then, the disk conveying mechanism is driven to eject the optical disk from the rotary table, and the optical disk is conveyed to the disk reproducing mechanism, thereby loading this optical disk. Thus, the optical pickup reproduces the information signal such as the musical sound signal recorded on the optical disk.

If the reproducing operation of the optical disk is finished, then the chucking of the optical disk by the reproducing mechanism is released, the optical disk is returned by the disk conveying mechanism to the rotary table side and stocked in the original disk stocker portion, whereby the predetermined reproducing operation by the above-mentioned selection operation is ended and the reproducing operation of the next optical disk becomes possible.

However, in the above-mentioned disk stocker apparatus, in order to miniaturize the apparatus and to improve a space factor, a spacing between the optical disks should be reduced as much as possible. Also, it is requested that optical disks can be ejected and stocked reliably. However, since each disk stocker portion for stocking the optical disk vertically is of the structure that the outer peripheral surface of the optical disk, i.e., the whole of the thickness portion of the optical disk, is supported, the optical disk may be scratched. Also, when the optical disk is loaded, it is unavoidable that harm to the disk tends to occur.

In the disk stocker apparatus used in the above-mentioned disk reproducing apparatus, for example, as shown in FIG. 1 of the accompanying drawings, a bottom surface 2a of each disk stocker portion 2 of a rotary table 1 is formed as a flat surface, and the whole of the outer peripheral surface (thick portion) of an optical disk D is supported by the bottom surface 2a. In the thus supported optical disk D, a thickness t is generally 1.2 mm. However, since it is extremely difficult to accurately form the thickness t as 1.2 mm, the thickness t is given a tolerance ranging from +0.3 mm to −0.1 mm. Accordingly, the maximum dimension of the thickness t of the optical disk D is 1.5 mm and the minimum dimension is 1.1 mm.

As a consequence, adding a spare thickness of 0.1 mm to the maximum thickness of 1.5 mm of the optical disk D obtained from the above-mentioned tolerance, a width S of the bottom surface 2a of the disk stocker portion 2 becomes 1.6 mm. Then, since the minimum dimension of the thickness t of the optical disk D is 1.1 mm, in this case, a large clearance of 0.5 mm is produced between it and the disk stocker portion 2. If there is produced such clearance, then the optical disk D is no longer supported vertically by the disk stocker portion 2 but supported with an inclination. As a result, the optical disk D will contact with an opening-side corner portion 2b of the disk stocker portion 2 or will contact with and rub against the other optical disk D stocked in the adjacent disk stocker portion 2, thereby resulting in the optical disk D being scratched or damaged.

SUMMARY OF THE INVENTION

It is, therefore, an object of the present invention to provide a recording and/or reproducing apparatus for a disk-like recording medium in which the above-mentioned problems can be solved.

According to the present invention, there is provided a recording and/or reproducing apparatus for a disk-like recording medium which includes a stocker portion, a rotary drive mechanism, a recording and/or reproducing mechanism and a conveying mechanism. The stocker portion stocks a plurality of disk-like recording media perpendicular to the recording and/or reproducing apparatus. The stocker portion includes a plurality of recess portions in which a plurality of disk-like recording media are respectively stocked. A plurality of recess portions are formed radially. Each recess portion has a substantially V-like cross section at its portion contacting the outer peripheral edge portion of the disk-like recording medium. The rotary drive mechanism rotates the stocker portion. The recording and/or reproducing mechanism records and/or reproduces the disk-like recording medium. The conveying mechanism extracts a desired disk-like recording medium from the stocker portion rotated by the rotary drive mechanism, conveys the extracted desired disk-like recording medium to the recording and/or reproducing mechanism, extracts the disk-like recording medium from the recording and/or reproducing mechanism and conveys the extracted disk-like recording medium to the stocker portion.

According to the present invention, there is provided a recording and/or reproducing apparatus for a disk-like recording medium which includes a stocker portion, a rotary drive mechanism, a recording and/or reproducing mechanism, a conveying mechanism, a housing and an operation unit. The stocker portion stocks a plurality of disk-like recording mediums vertically. The stocker portion has a plurality of recess portions in which a plurality of disk-like recording media are stocked respectively. A plurality of recess portions are formed radially. Each recess portion has a substantially V-like cross section at its portion contacting with the outer peripheral edge portion of the disk-like recording medium. The rotary drive mechanism rotates the stocker portion. The recording and/or reproducing mechanism records and/or reproduces the disk-like recording medium. The conveying mechanism extracts a desired disk-like recording medium from the stocker portion rotated by the rotary drive mechanism, conveys the extracted desired disk-like recording medium to the recording and/or reproducing mechanism, extracts the disk-like recording medium from the recording and/or reproducing mechanism and conveys the extracted disk-like recording medium to the stocker portion. The housing houses the stocker portion, the rotary drive mechanism, the recording and/or reproducing mechanism and the conveying mechanism. The housing has an opening portion through which the stocker portion is partly exposed to the outside. The operation unit enables the rotary drive mechanism to rotate the stocker portion under the condition that the stocker portion is exposed to the outside.

BRIEF DESCRIPTION OF THE DRAWINGS

The present invention will be more readily understood with reference to the accompanying drawings, wherein.

DESCRIPTION OF THE INVENTION

A recording and/or reproducing apparatus for a disk-like recording medium according to an embodiment of the present invention will be described with reference to the drawings. In the following embodiment, a disk reproducing apparatus using a preformatted optical disk such as a compact disc as a disk-like recording medium will be described by way of example.

Figure 1:
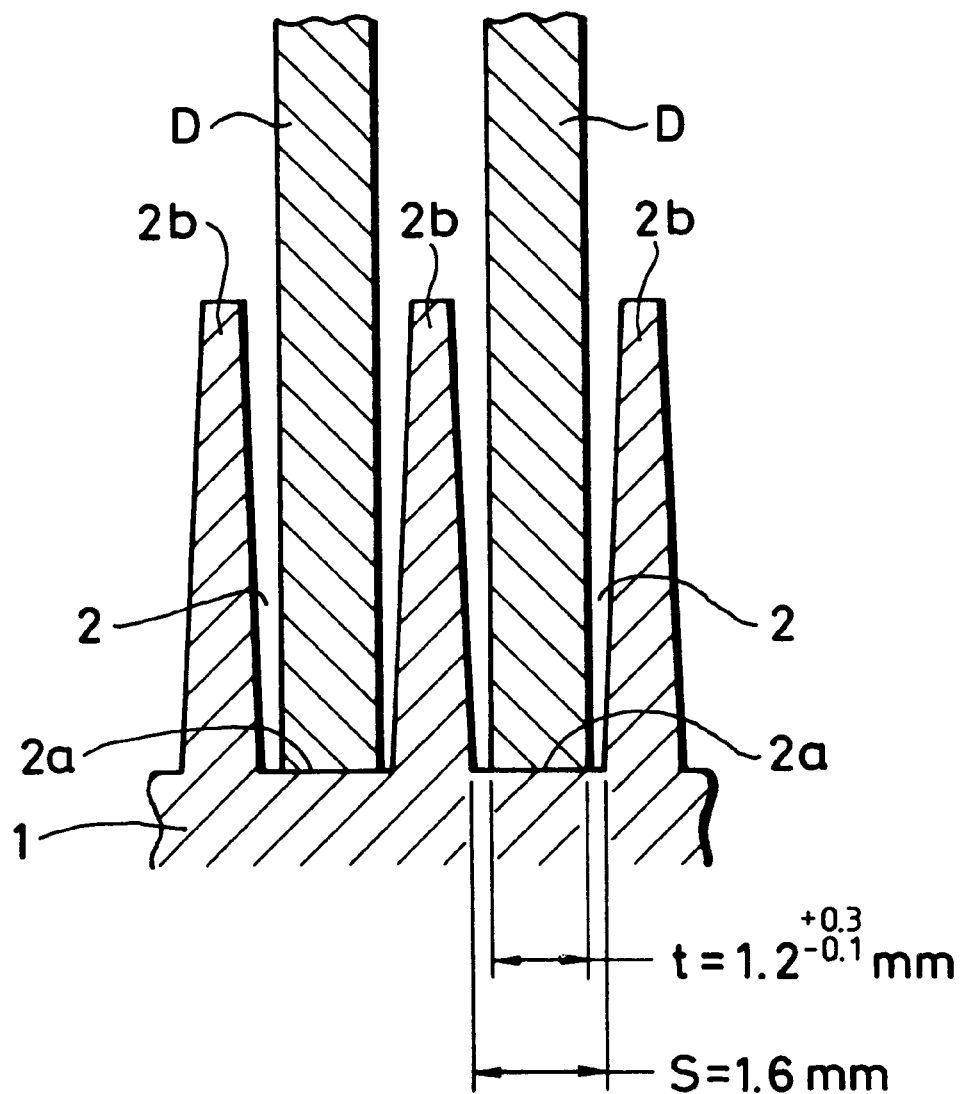
FIG. 1 is a cross-sectional view illustrating a cross-section of a main portion of a disk stocker portion of a conventional disk stocker apparatus.
Figure 2:
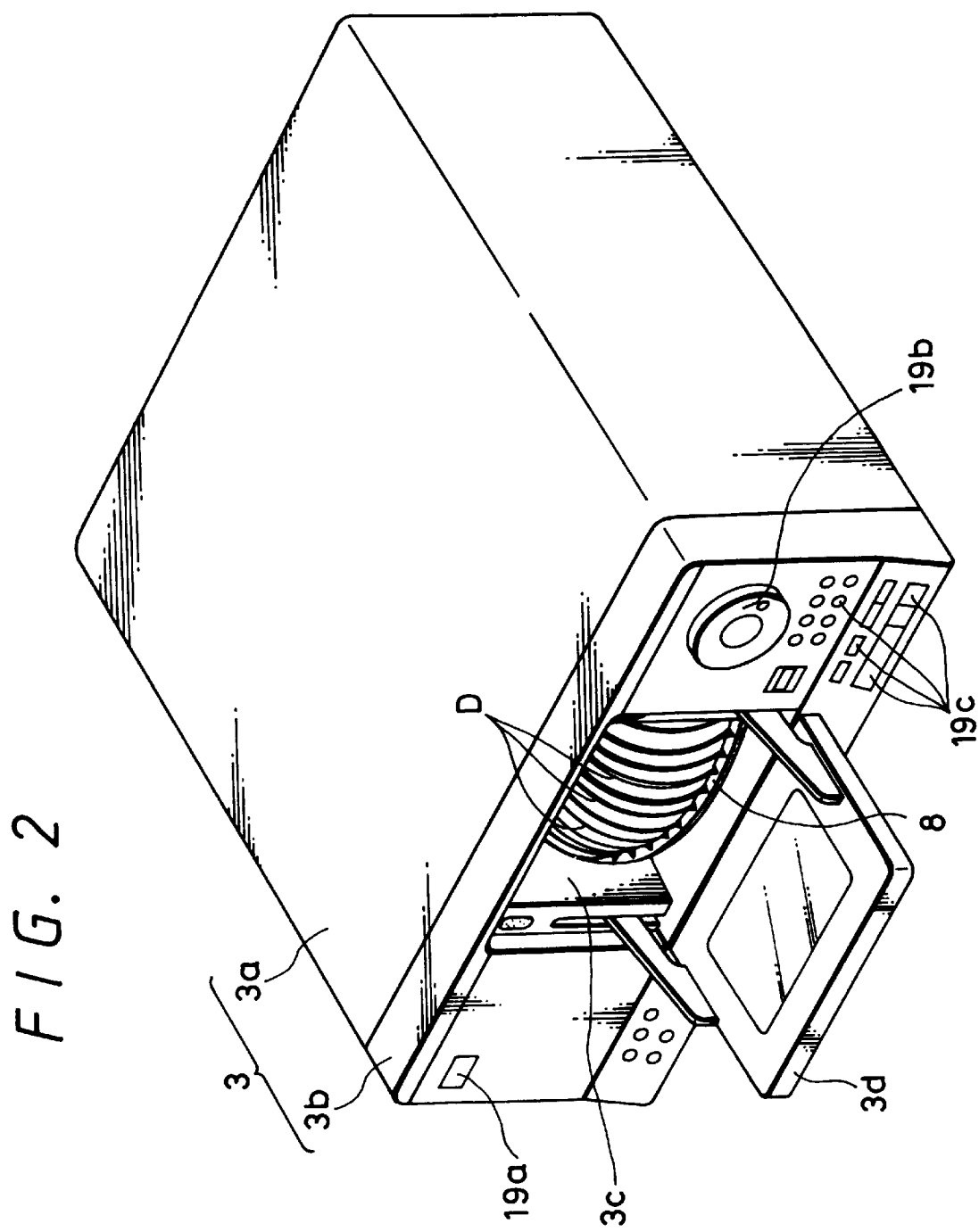
FIG. 2 is a perspective view illustrative of an appearance of a disk reproducing apparatus according to an embodiment of the present invention with a front lid being opened.
Figure 3:
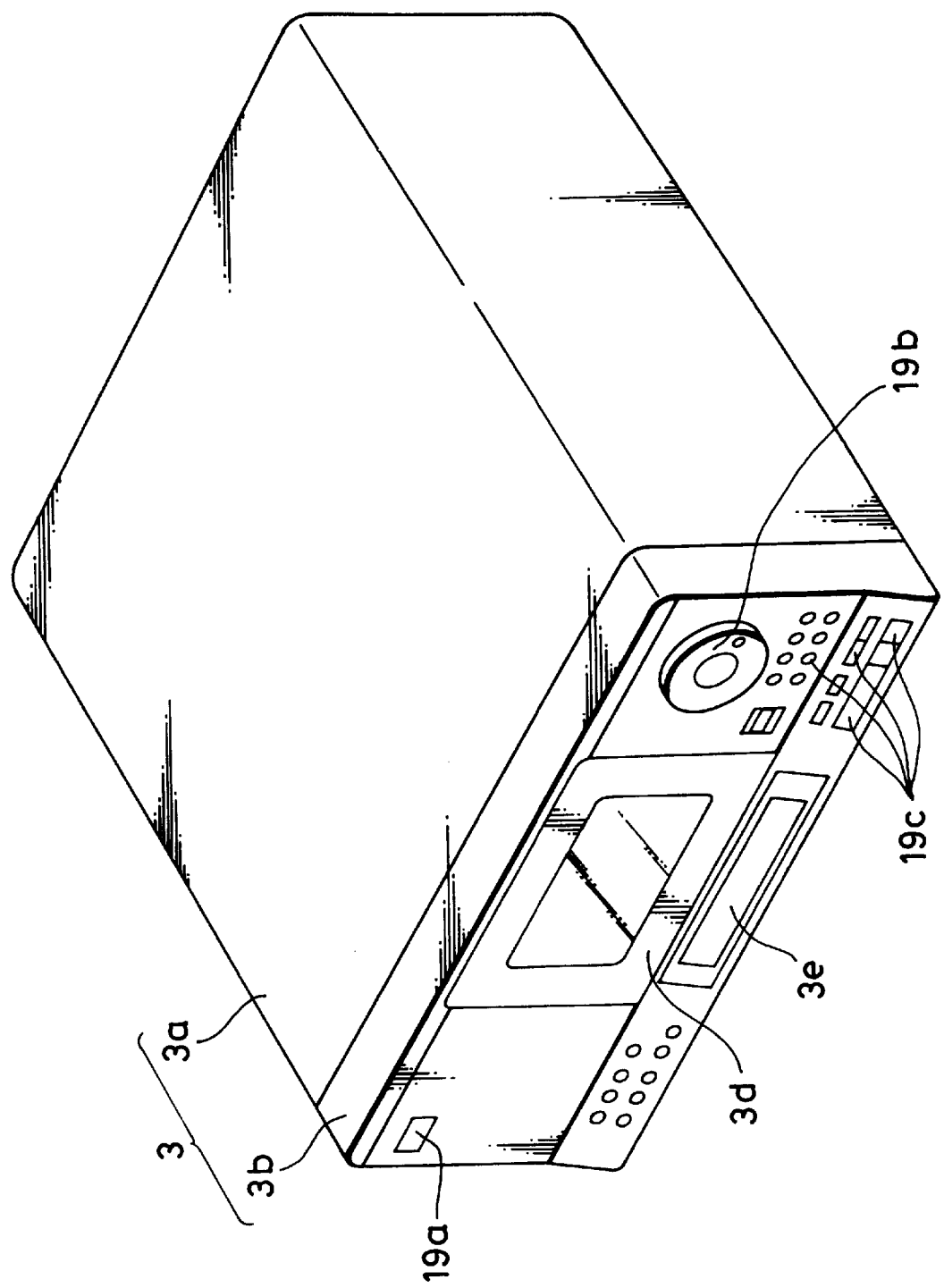
FIG. 3 is a perspective view illustrative of an appearance of the disk reproducing apparatus according to the embodiment of the present invention with the front lid being closed.

As shown in FIGS. 2 and 3, a disk reproducing apparatus according to the present invention includes a housing 3 of a substantially square configuration in which a disk stocker apparatus 4, a disk conveying mechanism 5, a disk reproducing mechanism 6, etc., are housed. The disk stocker apparatus 4 stocks therein a plurality of (100 in this embodiment) optical disks D. The disk conveying mechanism 5 extracts a desired optical disk D selected from a plurality of optical disks D stocked in the disk stocker apparatus 4 and conveys the same. The disk reproducing mechanism 6 reproduces information recorded on the optical disk D conveyed by the disk conveying mechanism 5.

The housing 3 includes a box-shaped box body 3a opened on the front surface side and a front panel 3b which closes the opening of the front surface of the box body 3a. A slightly oblong opening 3c is defined at a substantially central portion of the front panel 3b. The opening portion 3c of the front panel 3b is closed by a front door 3d pivotally supported to the front panel 3b. A front portion of a rotary table 8 pivotally supported to the box body 3a is opposed to the opening portion 3c of the front panel 3b opened and closed by the front door 3d. A user can load and unload the optical disk D through this opening portion 3c.

The front panel 3b has attached thereto a power-supply switch 19a for turning on and off a power supplied from an external power supply (not shown), an operation dial 19b capable of rotating the rotary table 8 by a desired amount in the left and right direction in a manual fashion and a plurality of operation switches 19c such as play switch, a pause switch or a stop switch. The manner in which command signals are entered by the operation dial 19b and the operation switches 19c and operated states of the disk reproducing apparatus such as musical performance are displayed on a display portion 3e, which is formed of a liquid-crystal display (LCD) device, disposed under the opening portion 3c.

The disk stocker apparatus 4 disposed within the housing 3 includes the rotary table 8 pivotally supported to the box body 3a through a supporting shaft 7 and a table drive mechanism 9 for rotating the rotary table 8 around the supporting shaft 7. The supporting shaft 7 is penetrated through the center of the rotary table 8 and protruded from the rotary table 8 in the upper and lower direction. A supporting pin 11 of an upper bearing plate 10 fixed to the upper surface plate of the box body 3a of the housing 3 is rotatably fitted into the upper end of the upper protruded portion of the supporting shaft 7. A supporting pin 13 of a lower bearing plate 12 fixed to the lower surface plate of the box body 3a is rotatably fitted into the lower end of the lower protruded portion of the supporting shaft 7. Thus, the rotary table 8 can be rotated in parallel to the bottom surface of the housing 3.

Figure 7:
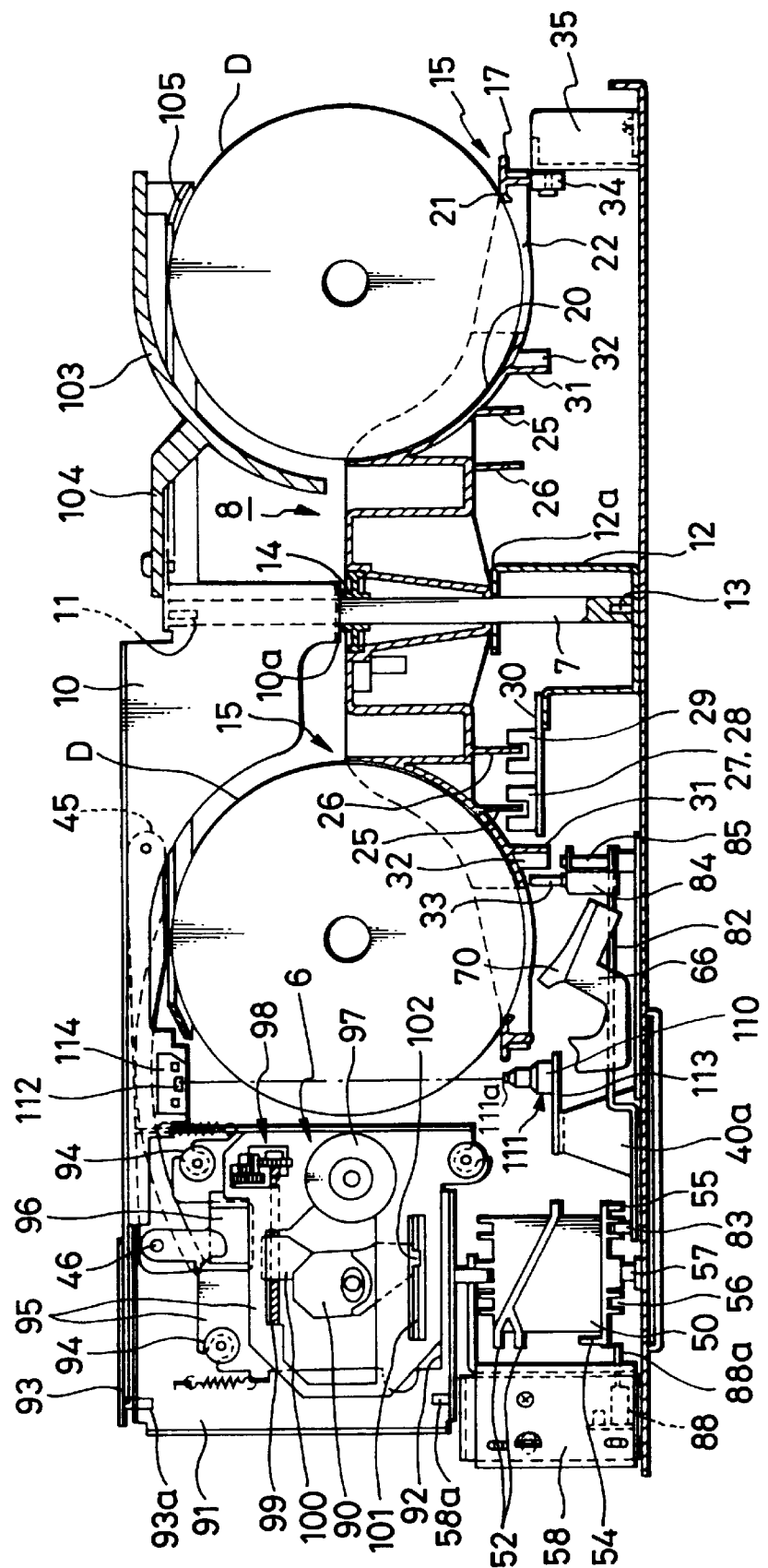
FIG. 7 is a longitudinal cross-sectional view illustrative of the inside arrangement of the disk reproducing apparatus.

The support shaft 7 is penetrated through a lower surface member 10a of the upper bearing plate 10 which is bent in parallel to the bottom surface of the housing 3 and an upper surface member 12a of the lower bearing plate 12. The upper surface member 12a supports the rotary table 8 from the lower direction and the lower surface member 10a inhibits the rotary table 8 from being moved in the upper direction. Thus, the rotary table 8 is arranged so as to constantly rotate at a predetermined height in the horizontal direction. In FIG. 7, reference numeral 14 denotes a bearing ring fixedly fitted into the central upper portion of the rotary table 8.

Figure 11:
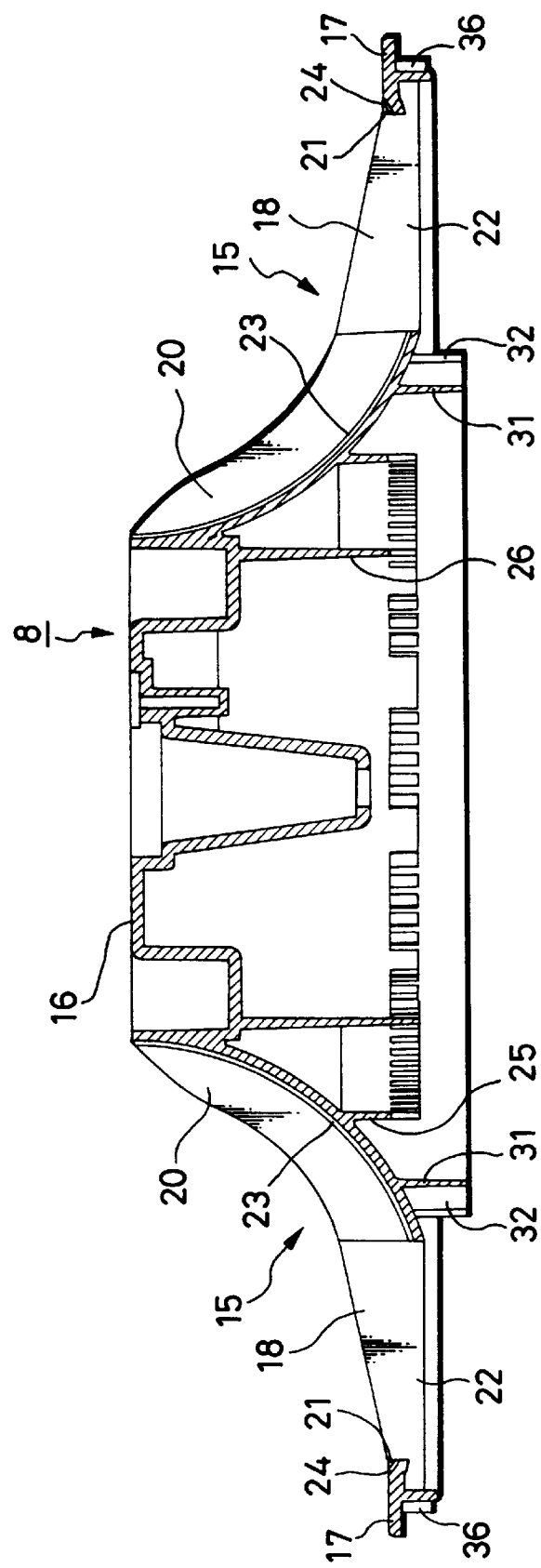
FIG. 11 is a cross-sectional view showing the arrangement of a rotary table of the disk stocker apparatus of the disk reproducing apparatus.

As shown in FIGS. 7 and 11, the rotary table 8 is formed as a disk whose inner upper surface is cylindrically increased in thickness. As show in FIG. 4, the rotary table 8 has on its inclined portion of the upper surface outside the radius direction a plurality of (100 in this embodiment) disk stocker portion 15 radially formed about the rotation center f the supporting shaft 7. As shown in FIG. 7, the rotary table 8 comprises a disk-like inner supporting member 16, an annular outer supporting member 17 concentrically provided to the inner supporting member 16 with a predetermined spacing in the radius direction, and a number of partition walls 18 for coupling the inner supporting member 16 and the outer supporting member 17. When 100 partition walls 18 are provided with an equal angular distance in the circumferential direction, as shown in FIG. 12, there are provided 100 disk stocker portions 15 each of which is an arcuately shaped recess portion.

Figure 12:
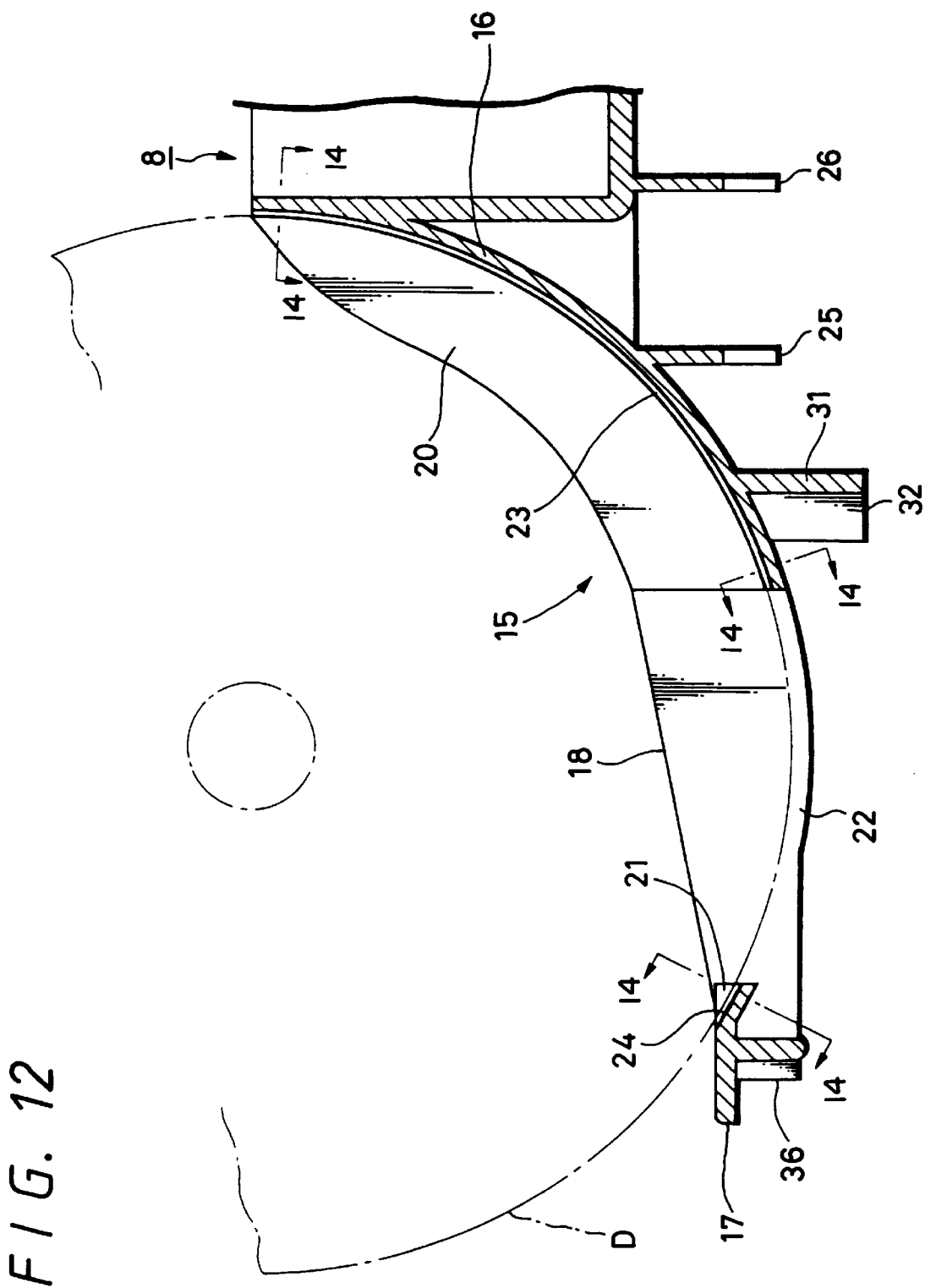
FIG. 12 is a cross-sectional view illustrating a main portion of the rotary table of the disk stocker apparatus of the disk reproducing apparatus in an enlarged scale.
Figure 13:
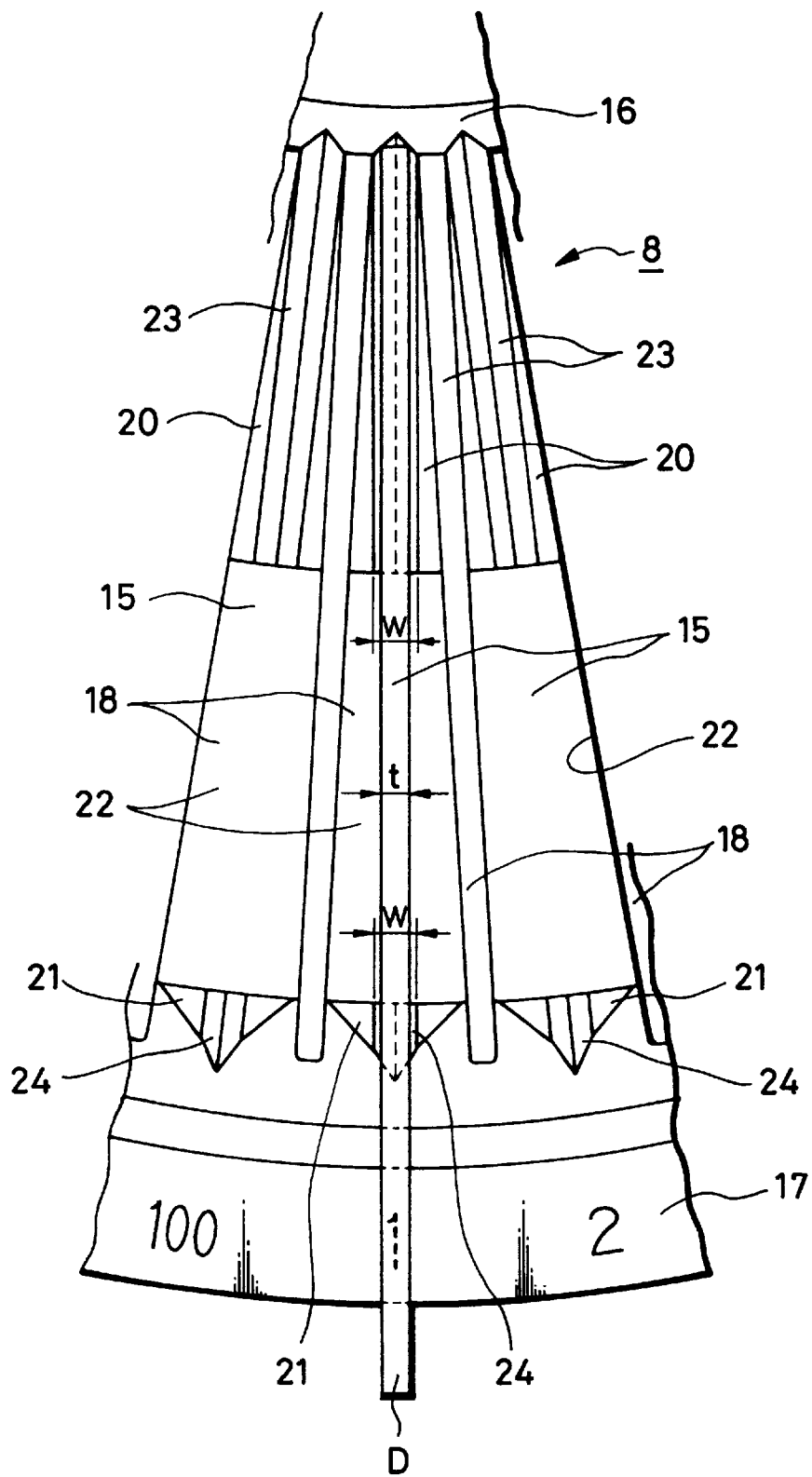
FIG. 13 is a cross-sectional view illustrating a main portion of the rotary table of the disk stocker apparatus of the disk reproducing apparatus in an enlarged scale.

As shown in FIGS. 11 and 12, the disk stocker portion 15 of the rotary table 8 comprises an inner receiving portion 20 formed on the upper surface of the inner supporting member 16, an outer receiving portion 21 formed on the upper surface of the outer supporting member 17 and an operation opening 22 composed of a vertical opening defined between the adjacent partition walls 18. As shown in FIG. 13, the inner receiving portion 20 and the outer receiving portion 21 are formed so as to have V-like or U-like cross sections. V-like grooves 23, 24 each having a radius of curvature corresponding to a radius of curvature of the outer peripheral surface of the optical disk D and a substantially V-like cross section are formed on the bottom surface.

Figure 14:
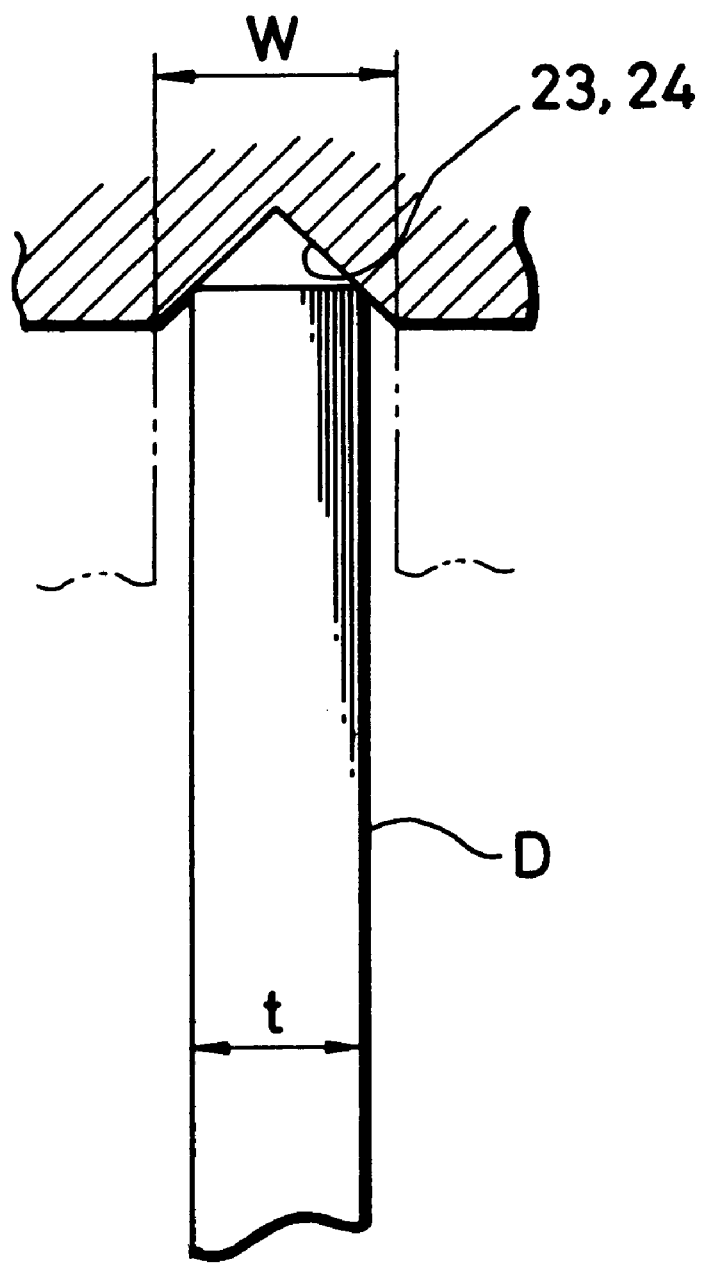
FIG. 14 is a cross-sectional view taken along the lines 14—14 of the rotary table shown in FIG. 12.

Specifically, the V-letter groove 23 of the inner receiving portion 20 is extended over the whole length of the bottom surface along the wall of the inner receiving portion 20. On the other hand, the V-like groove 24 of the outer receiving portion 21 is formed on the upper corner portion of the inner peripheral side of the outer supporting member 17 in such a manner as to oppose the V-like groove 23. The V-like groove 24 of the outer receiving portion 21 and the outer peripheral side of the V-like groove 23 of the inner receiving portion 20 support the lower portion of the optical disk D, and the inner peripheral side of the V-like groove 23 of the inner receiving portion 20 support the side portion of the optical disk D. As shown in FIG. 14, width W of the V-like grooves 23, 24 is larger than a thickness t of the optical disk D (W>t). In this embodiment, since the maximum value of the tolerance of the thickness of the optical disk D is 1.5 mm as described above, the width W of the V-like grooves 23, 24 at their opening sides is set to 1.6 mm or a value slightly larger than 1.6 mm.

When the optical disk D is stocked in the disk stocker portion 15 of the rotary table 8, both outer peripheral edges of the outer peripheral surface of the optical disk D are respectively brought in contact with both inclined surfaces of the V-like grooves 23, 24, and the optical disk D is supported by these inclined surface portions. In addition, both outer peripheral edges of the outer peripheral surface of the optical disk D are contacted with each other in line over substantially the whole length of the V-like grooves 23, 24 and the optical disk D is sandwiched at its both sides by two parallel planes including the above contact line. Accordingly, owing to the action of the V-like grooves 23, 24, the optical disk D is reliably held by the disk stocker portion 15 and supported lengthwise in substantially the vertical direction.

Such action of the V-like grooves 23, 24 can be obtained even when the thickness of the optical disk D is changed considerably. Therefore, since both outer peripheral edges of the outer peripheral surface of the optical disk D are contacted with both inclined surfaces of the V-like grooves 23, 24, even when the optical disks D are different in thickness, such optical disks D can be substantially vertically supported highly reliably. Since the optical disk D is supported only at its non-signal recording regions, in which an information signal is not recorded, of both outer peripheral edges of the outer peripheral surface by the inner receiving portion 20 and the outer receiving portion 21 of the disk stocker portion 15, a signal recording region, in which an information signal is recorded, formed on the inner peripheral side can be reliably prevented from contacting with the side wall composing the disk stocker portion 15, thereby effectively preventing the signal recording area from being damaged.

As shown in FIGS. 7 and 11, first and second detection plates 25 and 26 each formed as an annular plate are concentrically formed at the supporting shaft 7 on the lower surface side of the rotary table 8. The first detection plate 25 is larger than the second detection plate 26 in diameter and has slits formed on its lower end face with a predetermined pitch in the circumferential direction. The number of slits corresponds to the number of the disk stocker portions 15 disposed on the rotary table 8, and formed at the same pitch. Accordingly, the first detection plate 25 has 100 slits in this embodiment.

The second detection plate 26 is positioned inside the first detection plate 25 and has on its lower end face formed 10 slits at different pitches in the circumferential direction. Respective positions of the 100 disk stocker portions 15 can be specified by the 10 slits of the second detection plate 26 at the different pitches and the 100 slits of the first detection plate 25 at the same pitch. There are provided three photosensors 27, 28, 29 in association with the first and second detection plates 25, 26.

Each of the three photosensors 27, 28, 29 is a combination of a light-emitting device and a light-receiving device, and are attached to an attachment plate 30 fixed to the lower bearing plate 12 which pivotally supports the supporting shaft 7 of the rotary table 1. The first photosensor 27 and the second photosensor 28 are disposed with a predetermined spacing relative to the first detection plate 25 and the third photosensor 29 is disposed relative to the second detection plate 26. The first to third photosensors 27 to 29 are adapted to output detection signals of high level when they detect the slit portions of the corresponding detection plates 25, 26.

The detection signals from the three photosensors 27 to 29 are supplied to a controller (not shown), and the controller can specify 100 disk addresses corresponding to the 100 disk stocker portions 15 by effecting a predetermined computation based on the detection signals supplied thereto. When the positions of the 100 disk stocker portions 15 on the rotary table 1 are specified, an optical disk D in a disk stocker portion 15 of a desired disk number can be extracted from the disk stocker portion 15 or an optical disk D can be stocked in a disk stocker portion 15 of a desired disk number easily and accurately.

Figure 9:
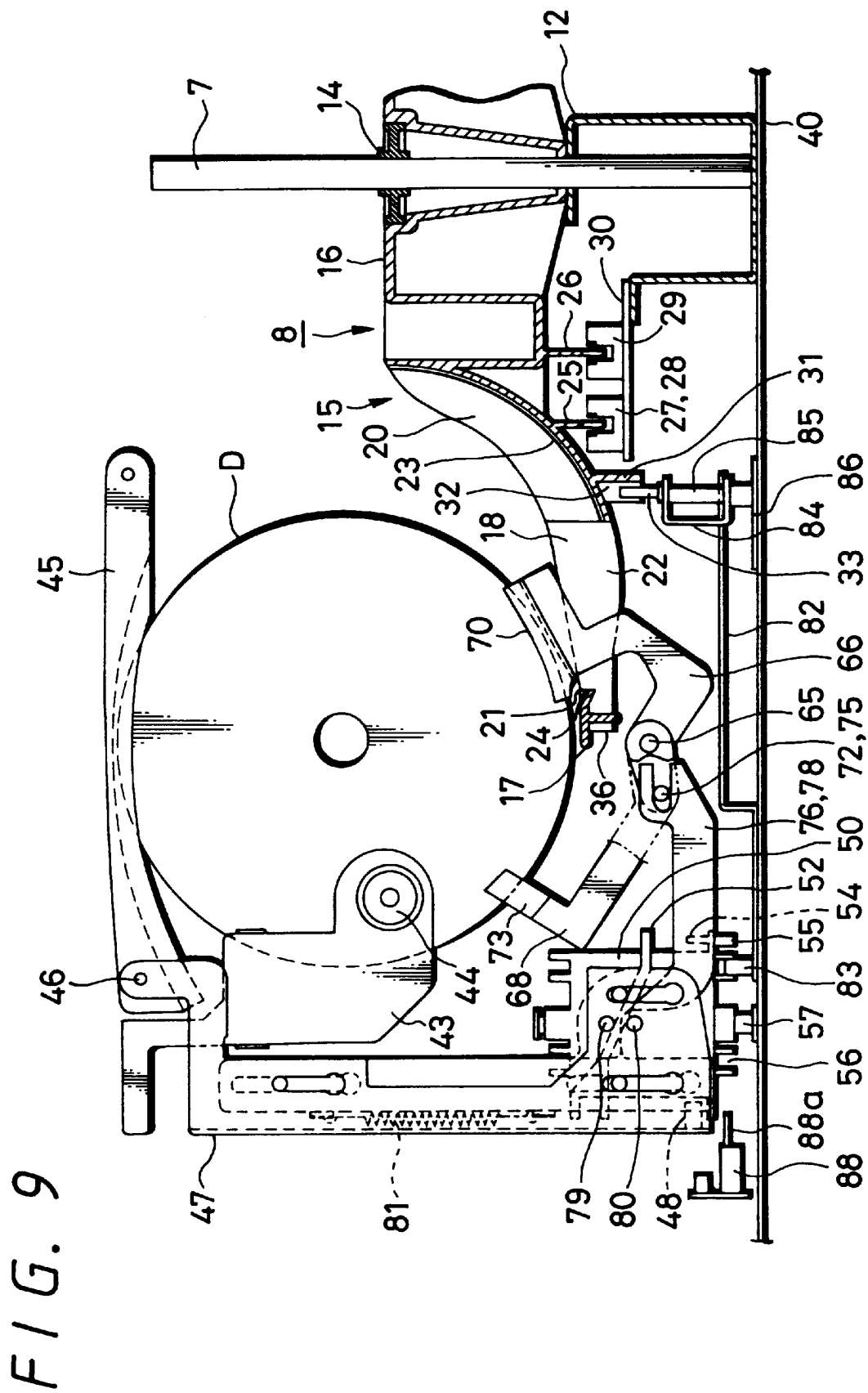
FIG. 9 is a diagram showing the manner in which the disk conveying mechanism of the disk reproducing apparatus is operated, and to which reference will be made in explaining the state that the disk conveying mechanism is conveying the optical disk.

A cylindrical lock plate 31 is disposed outside the first detection plate 25 on the lower surface of the rotary table 8 so as to become concentric with the first and second detection plates 25, 26. As shown in FIG. 11, the lock plate 31 includes 100 lock recess portions 32, which are opened to the outside of the radius direction, at an equal interval in correspondence with the disk stocker portion 15. As shown in FIG. 9, when a stopper pin 33 is engaged with a desired lock recess portion, the rotary table 8 can be prevented from being rotated and placed at a desired position, thereby locking the rotary table 8 for a disk stocker portion 15 of a desired disk number.

Figure 4:
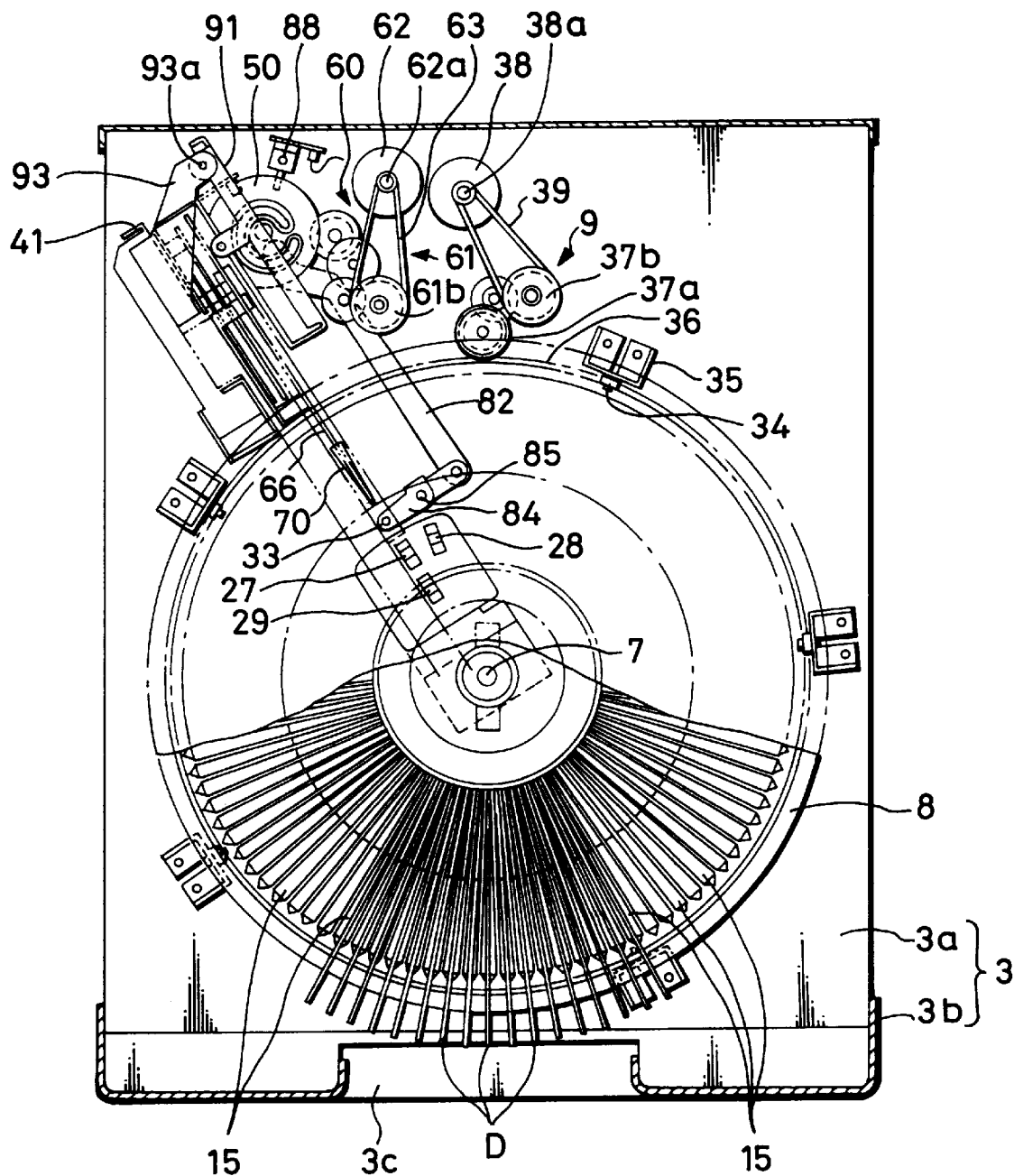
FIG. 4 is a plan view illustrative of an inside arrangement of the disk reproducing apparatus.

As shown in FIGS. 4 and 7, a plurality of supporting rollers 34 support the outer supporting member 17 which is an outer peripheral edge of the rotary table 8 from the lower direction. These supporting rollers 34 are five rollers disposed at an equal interval along the circumferential direction. If these five supporting rollers 34 support the outer peripheral edge of the rotary table 8, then it is possible to prevent the outer peripheral edge of the rotary table 8 from being flexibly deformed when the optical disk D is stocked in the disk stocker portion 15. These supporting rollers 34 are pivotally attached to supporting plates 35 erected on the box body 3a by supporting pins. Owing to the action of the supporting rollers 34, it is possible to maintain a stability of rotation of the rotary table 8 when a heavy load is imposed upon the rotary table 8 when the optical disks D are stocked in all disk stocker portions 15.

Figure 5:
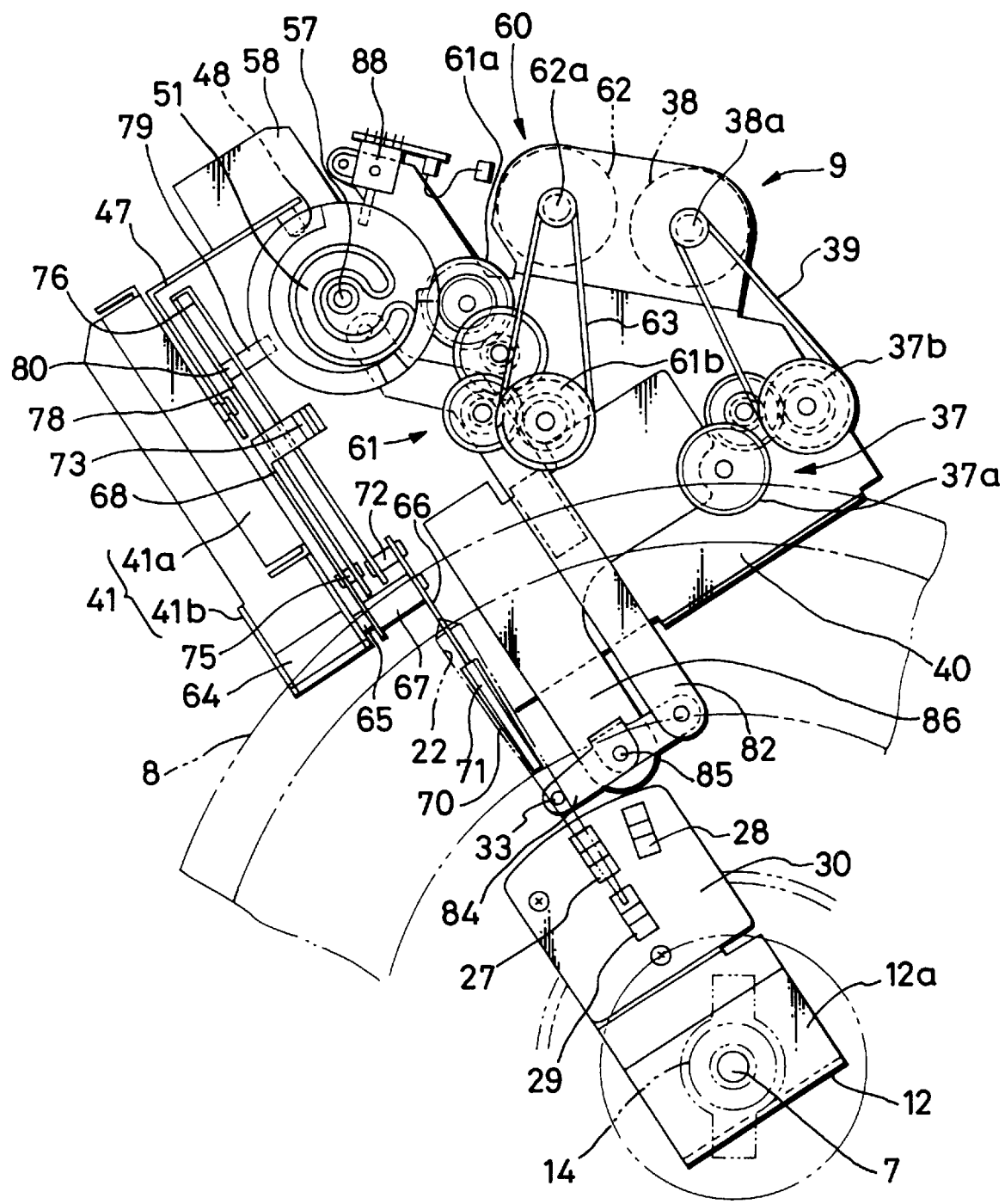
FIG. 5 is a plan view illustrating a disk conveying mechanism portion in the inside arrangement of the disk reproducing apparatus shown in FIG. 4 in an enlarged scale.

As shown in FIG. 11, a gear portion 36 is formed over the whole circumference of the outer peripheral surface of the rotary table 8, i.e., outer peripheral surface of the outer supporting member 17. This gear portion 38 is used to rotate the rotary table 8. As shown in FIG. 5, the gear portion 36 is meshed with an output gear 37a of a reduction gear train 37 of the table drive mechanism 9. Through this reduction gear train 37, the rotary table 8 and a table drive motor 38 are coupled so as to transmit a power. The reduction gear train 37 comprises five gears including the output gear 37 and a follower pulley 37b. A drive belt 39 is stretched between the follower pulley 37b and a drive pulley 38a fixed to the rotary shaft of the table drive motor 38. While the table drive motor 38 is fixed to the base plate 40, the reduction gear train 37 is rotatably attached to the base plate 40 through a plurality of shaft members.

Figure 6:
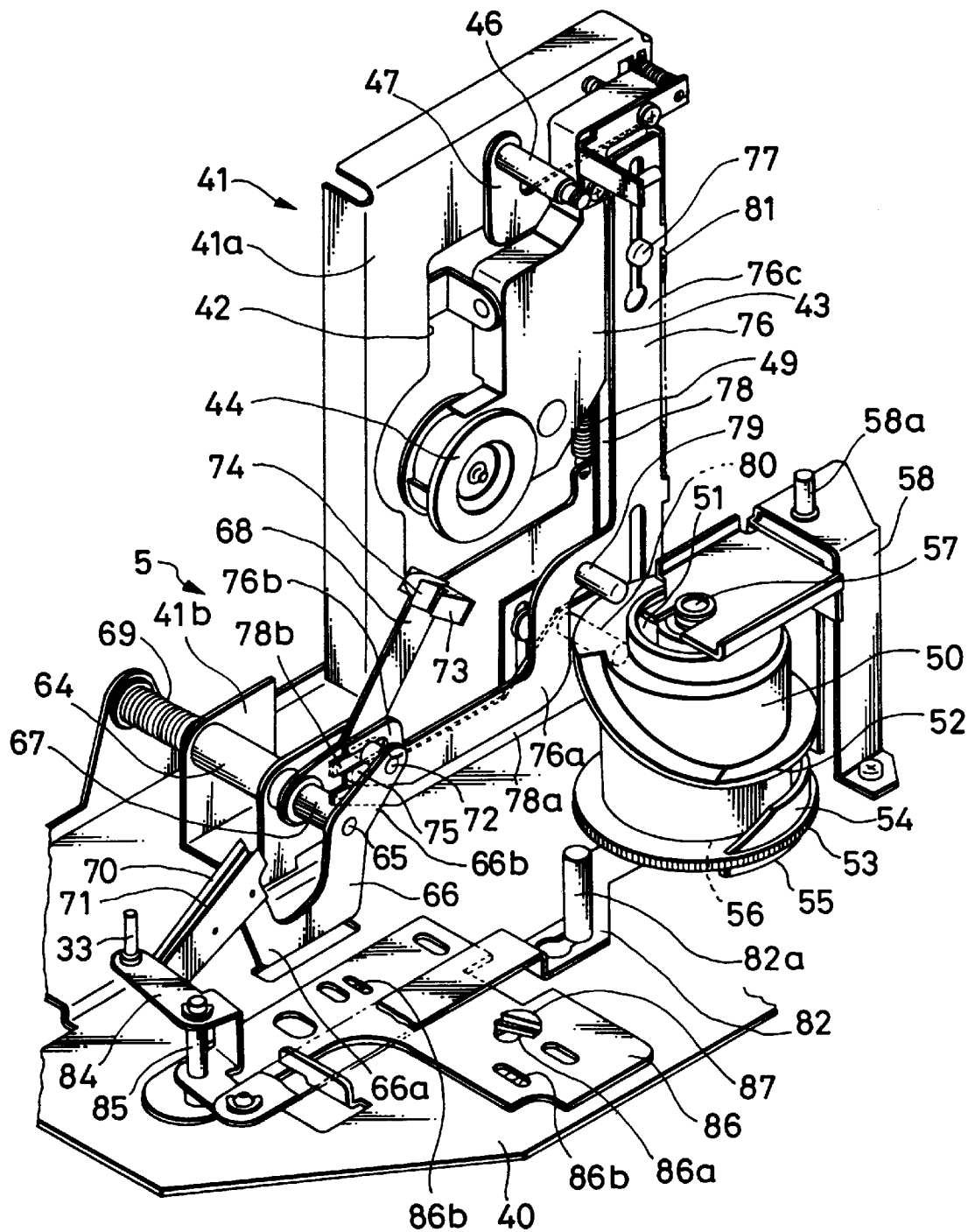
FIG. 6 s a perspective view illustrating a disk conveying mechanism of the disk reproducing apparatus.

As shown in FIGS. 6 and 7, a stand plate 41 is erected on the base plate 40. The disk conveying mechanism 5 and the disk reproducing mechanism 6 are provided in association with the stand plate 41. As shown in FIG. 6, the stand plate 41 comprises a vertical plate portion 41a vertically disposed on the base plate 40 and a bearing portion 41b continuously formed on one side of the surface direction of the vertical plate portion 41a. An opening window 42 is defined on the vertical plate portion 41a, and an arm bracket 43 is disposed in the opening window 42 of the stand plate 41. When the upper portion of the arm bracket 43 is rotatably supported to the stand plate 41, a chucking plate 44, which is rotatably supported to the lower portion of the arm bracket 43, can be swingably moved in the lateral direction.

As shown in FIG. 7, a base end of the upper bearing plate 10 for fixedly supporting the supporting shaft 7 is fixed to the upper end of the stand plate 41. A disk guide 45 is disposed on one surface side of the upper bearing plate 10. One end of the disk guide 45 is rotatably supported to the tip end side of the upper bearing plate 10, and the other end thereof is horizontally elongated and pivotally supported to the tip end side of the upper bearing plate 10 so that the disk guide 45 can be swingably moved in the upper and lower direction. An engagement pin 46 is inserted into and engaged with the end portion of the swinging side of the disk guide 45. This engagement pin 46 is fixed to the upper end portion of a guide link 47 slidably held on the stand plate 41 in the upper and lower direction. As shown in FIGS. 4 and 5, the lower end portion of the guide link 47 is bent in the lateral direction and disposed behind a cylindrical cam 50. A cam pin 48 fixed to the tip end of the bent portion is spring-biased to a disk guide drive cam portion 54 of the cylindrical cam 50 under spring force of a spring 49.

As shown in FIG. 6, the cylindrical cam 50 includes an optical system drive cam portion 51 disposed on the upper surface of the cylindrical cam body, an arm drive cam portion 52 disposed on the outer peripheral surface of the cam body, a gear portion 53 disposed on the lower portion of the cam body, the disk drive cam portion 54 disposed on the upper surface of the gear portion 53, a rotary table drive cam portion 55 disposed on the lower surface of the gear portion 53 and a stopper pin drive cam portion 56 disposed on the lower surface of the cam body. The cylindrical cam 50 is rotatably fitted into a pivot 57 implanted on the base plate 40 and the upper portion of the rotation center thereof is rotatably supported by a cam bracket 58 fixed to the base plate 40.

As shown in FIG. 5, the gear portion 53 of the cylindrical cam 50 is meshed with an output gear 61a of a reduction gear train 61 of the cam drive mechanism 60, and the cylindrical cam 50 is coupled to a cam drive motor 62 through this reduction gear train 61 so as to transmit power. The reduction gear train 61 comprises 7 gears including the output gear 61 and a follower pulley 61b. A drive belt 63 is extended between the follower pulley 61b and a drive pulley 62a fixed to the rotary shaft of the cam drive motor 62. While the cam drive motor 62 is fixed to the base plate 40, the reduction gear train 61 is rotatably attached to the base plate 40 through a plurality of shaft members.

As shown in FIG. 6, a shaft sleeve 64 is fixed to the bearing portion 41a of the stand plate 41 under the condition that the center hole is oriented in the lateral direction. A rotary shaft 65 is rotatably inserted into the center hole of the shaft sleeve 64. A first arm 66 is fixed to the tip end of one protruded portion of the rotary shaft 65 and thereby integrally formed therewith in the rotation direction. Also, a sleeve 67 is rotatably fitted into the inside of the first arm 66. A second arm 68 is fixed to the sleeve 67 and thereby integrally formed therewith in the rotation direction. The first and second arms 66, 68 are spring-biased to the shaft sleeve 64 side under spring force of a coil spring 69 fitted into the other protruded portion of the rotary shaft 65.

The first arm 66 includes an action member 66a extended to one side of the radius direction around the rotary shaft 65 and an input member 66b extended to the opposite side. The action member 66a is shaped as substantially U-letter in order to escape the outer supporting member 17 of the rotary table 8, and a first conveying click 70 is fixed to the tip end thereof. The first conveying click 70 is used to lift the optical disk D stocked in the disk stocker portion 15 on the rotary table 8 to move the same toward the disk reproducing mechanism 6 side or to return the optical disk D loaded onto the disk reproducing mechanism 6 to the disk stocker portion 15. The first conveying click 70 is shaped in accordance with the planar shape of the operation opening 22 in such a manner that the operation opening defined in each disk stocker portion 15 of the rotary table 8 can be passed in the upper and lower direction. A supporting groove 71 for supporting the optical disk D so as not to be dropped is formed on the upper surface of the first conveying click 70. A slide pin 72 is fixed to the tip end portion of the input member 66b of the first arm 66.

The second arm 68 is elongated toward the input member 66b of the first arm 66 and the tip end portion thereof is bent toward the first arm 66 side. A second conveying click 73 is fixed to the tip end of the second arm 68. The second conveying click 73 holds the optical disk D in cooperation with the first conveying click 70 thereby to convey the optical disk D between the rotary table 8 and the disk reproducing mechanism 6. The second conveying click 73 has formed a supporting groove 74 for supporting the optical disk D so as not to be dropped is formed on the second conveying click 73. The second conveying click 73 is attached to the second arm 68 so as to oppose the supporting groove 74 relative to the supporting groove 71 of the first conveying click 70. A slide pin 75 is fixed to the intermediate portion of the second arm 68.

A bifurcated portion 76b disposed at the tip end of a horizontal portion 76a of a first L-like link 76 is slidably engaged with the slide pin 72 of the first arm 66. A first L-shaped link 76 is disposed on the cylindrical cam 50 side of the stand plate 41. Two guide pins 77 fixed to the stand plate 41 are slidably engaged with two oblong holes defined in a vertical porting 76c of the L-shaped link 76, whereby the first L-shaped link 76 is supported so as to become slidable in the upper and lower direction. A bifurcated portion 78b disposed on the tip end of a horizontal portion 78a of a second L-shaped link 78 is slidably engaged with the slide pin 75 of the second arm 68. The second L-shaped link 78 is disposed so as to overlap the first L-shaped link 76 with a predetermined spacing and the two guide pins 77 are slidably engaged with the two oblong holes defined in the vertical portion 76c of the second L-shaped link 78, whereby the second L-shaped link 78 also is supported so as to become slidable in the upper and lower direction.

An upper cam pin 79 which is protruded in the cylindrical cam 50 side is fixed to the base portion of the horizontal portion 76a of the first L-shaped link 76, and a lower cam pin 80 which is protruded in the cylindrical cam 50 side is fixed to the base portion of the horizontal portion 78a of the second L-shaped link 78. The upper and lower cam pins 79, 80 are disposed across the arm drive cam portion 52 of the cylindrical cam 50 so as to oppose to each other in the upper and lower direction. A spring 81 is extended between the first and second L-shaped links 76 and 78. The upper cam 79 is spring-biased to the upper surface of the arm drive cam portion 52 under spring force of the spring 81. Also, the cam pin 80 is spring-biased to the lower surface of the arm drive cam portion 52 under spring force of the spring 81. The first arm 66 and the second arm 68 are moved in different ways due to the shapes of the upper and lower cam surfaces of the arm drive cam portion 52, as will be described later on, thereby making it possible to convey the optical disk D.

The stopper pin drive cam portion 56 of the cylindrical cam 50 is formed of a substantially C-like cam groove, and a cam pin 83 fixed to the base end of the slide lever 82 is slidably engaged with the stopper pin drive cam portion 56 as shown in FIG. 6. The stopper pin drive cam portion 56 is deviated from the pivot 57 which becomes the rotation center of the cylindrical cam 50, and the slide lever 82 is slid with a predetermined slide amount by this deviation amount. The tip end of the slide lever 82 is extended toward the center side of the rotary table 8 and guided to the base end side of the lever pin 82a implanted on the base plate 40. The tip end of the slide lever 82 is rotatably coupled to the base end of a swing lever 84. A rotary shaft 85 is inserted into the intermediate portion of the swing lever 84, and the stopper pin 33 is fixed to and upwardly protruded from the opposite tip end of the swing lever 84. The rotary shaft 85 is erected on the support plate 86 which is slidably supported to the base plate 40.

Figure 8:
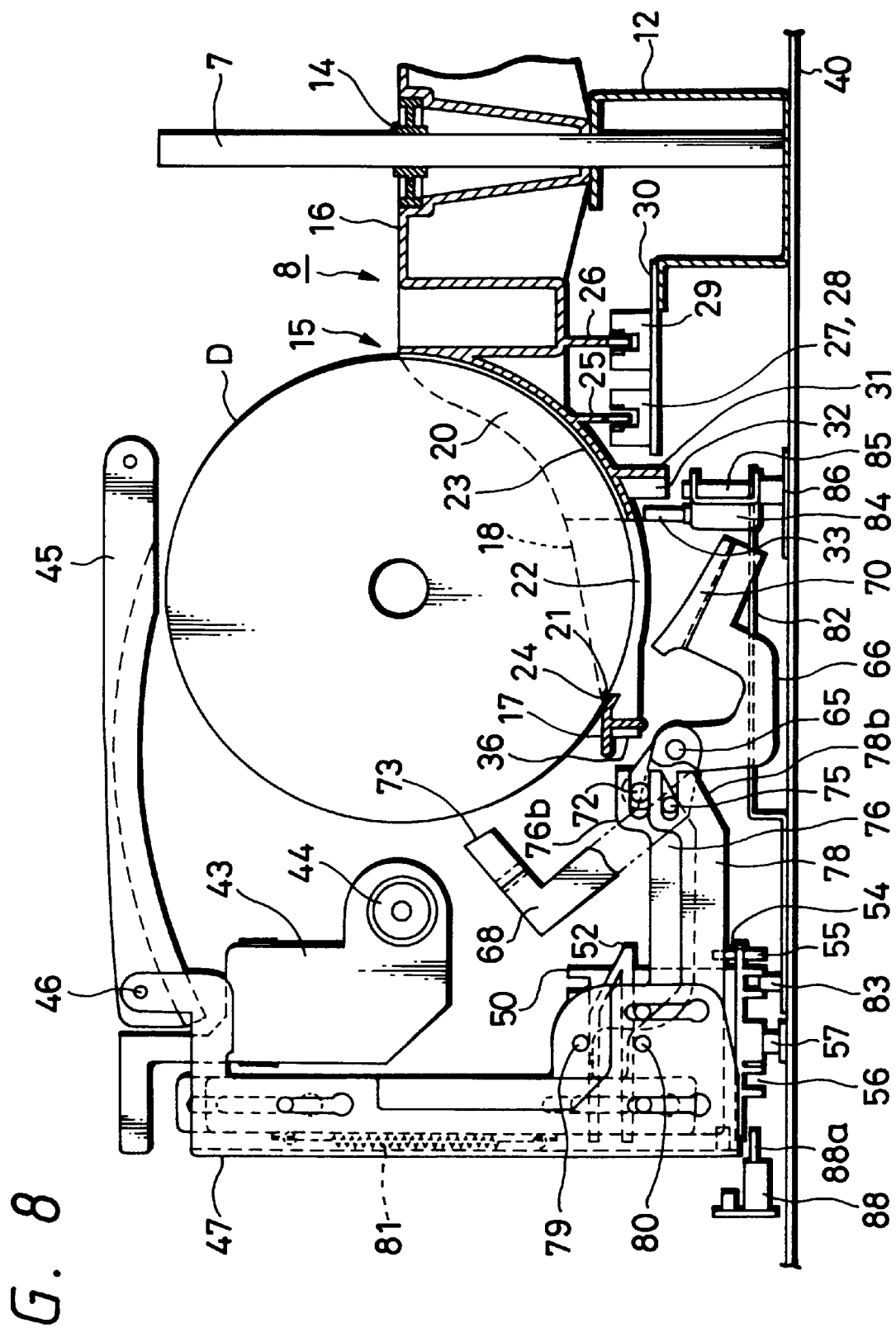
FIG. 8 is a diagram showing the manner in which the disk conveying mechanism of the disk reproducing apparatus is operated, and to which reference will be made in explaining the state that the disk conveying mechanism does not yet convey the optical disk.

The stopper pin 33 is advanced through a swing operation of the swing lever 84 by moving the slide lever 82 in the backward direction. As a result, as shown in FIG. 9, the stopper pin 33 enters the lock recess portion 32 formed on the lock plate 31 of the rotary table 8, thereby locking the rotary table 8 in the rotation direction. On the other hand, when the stopper pin 33 is moved in the backward direction by advancing the slide lever 82, as shown in FIG. 8, the stopper pin 33 is extracted from the lock recess portion 32, whereby the rotary table 8 is released from being locked in the rotation direction.

The supporting plate 86 has an oblong hole 86a extended in the direction in which the slide lever 82 is extended and a plurality of oblong holes 86b extended in the direction in which they cross the oblong hole 86a. Protrusions protruded from the base plate 40 are engaged with a plurality of oblong holes 86b of the support plate 86. These protrusions restrict the movement of the support plate 86, whereby the support plate 86 can be slid only in the above-mentioned crossing direction. An adjustment screw 87 rotatably supported to the base plate 40 is inserted into the oblong hole 86a of the supporting plate 86. A deviation shaft portion disposed between the head portion and the shaft portion of this adjustment screw 87 is rotatably fitted into the oblong hole 86a.

When the deviation shaft portion is deviated by turning the adjustment screw 87, the supporting plate 86 can be slid in the direction in which the supporting plate 86 is extended in response to the deviation amount of the deviation shaft portion. When the support plate 86 is slid by turning the adjustment screw 87, the position of the stopper pin 33 is changed together with the rotary shaft 85. As a result, the swing position of the stopper pin 33 is varied with the result that the lock position of the rotary table 8 can be adjusted by the advanced position of the stopper pin 33. If the lock position of the rotary table 8 is varied as described above, then the position of the operation opening 22 of each disk stocker portion 15 at the predetermined position of the rotary table 8 can be positioned at the first arm 66.

The disk guide drive cam portion 54 of the cylindrical cam 50 is formed of an arcuate protruded portion which is extended in the circumferential direction and the cam pin 48 can be elevated and lowered along the inclined surface formed at one end of the disk guide drive cam portion 54 in the circumferential direction. When the cam pin 48 is elevated on the cam portion 54 along the inclined surface, as shown in FIG. 8, the guide link 47 is elevated by the amount corresponding to the lifted amount of the cam pin 48. Owing to the action of the disk guide drive cam portion 54, when the optical disk D is chucked, the cam pin 48 is lifted and one end of the disk guide 45 is elevated through the action of the guide link 47 and the engagement pin 46, whereby the disk guide 45 is detached from the optical disk D. Thus, even when the optical disk D is twisted during its rotation, the optical disk D can be prevented from contacting the disk guide 45.

A rotary table drive cam portion 55 of the cylindrical cam 50 is formed of an arcuate protruded rail portion extended in the circumferential direction. As shown in FIGS. 5 and 7, a control switch 88 for detecting a rotation direction of the cylindrical cam 50 is turned on and off by both end edges of the rotary table drive cam portion 55 in the circumferential direction. A detected signal from the control switch 88 is inputted to the aforesaid controller (not shown) having a CPU (central processing unit), a RAM (random-access memory), a ROM (read-only memory) or the like. The controller executes a predetermined computing processing based on the detected signal from the control switch 88 to output control signals to the table drive motor 38 and the cam drive motor 62, thereby executing the loading and playing of the optical disk D as will be described later on.

As shown in FIG. 5, the optical system drive cam portion 51 of the cylindrical cam 50 is formed of a substantially C-shaped cam groove. This optical system drive cam portion 51 also is deviated from the pivot 57 which becomes the rotation center of the cylindrical cam 50 similarly to the stopper pin drive cam portion 56. As shown in FIG. 7, a cam pin 92 fixed to the lower end of a frame plate 91 with an optical pickup 90 mounted thereon is slidably engaged with the optical system drive cam portion 51. The frame plate 91 is opened and closed in a predetermined manner by the deviation amount of the cam portion 51.

As shown in FIGS. 4 and 7, the frame plate 91 is opposed to the cylindrical cam 50 side of the stand plate 41 with a predetermined spacing. The frame plate 91 is pivotally supported at its upper and lower rear portions by a support shaft 58a disposed on the cam bracket 58 and a support shaft 93a disposed on an arm bracket 93 fixed to the upper surface of the stand plate 41. As a result, the frame plate 91 can be swung at its side of the rotary table 8 in the left and right direction. The above-mentioned cam pin 92 is disposed on the lower portion of the frame plate 91. Thus, when the cam pin 92 is moved by the optical system drive cam portion 51, the frame plate 91 can be opened and closed toward the lower cylindrical cam 50 side.

As shown in FIG. 7, attachment plates 95 are resiliently supported through a plurality of mount members 94 to the frame plate 91 swingable in the left and right direction and in the lower direction in such a manner that the attachment plates 95 are flexed in the front and rear direction, in the left and right direction and in the upper and lower direction. A spindle motor and a pickup drive motor 96 are secured to the attachment plates 95. A disk table 97 is attached to the rotary shaft of the spindle motor. Although not shown, a circular truncated cone-like convex portion is formed on the disk table 97 in order to properly hold the optical disk D at its center. The chucking plate 44 is opposed to the disk table 97 in such a manner that the chucking plate 44 can come close to or come away from the disk table 97.

A feed screw shaft 99 is coupled through a reduction gear train 98 to the pickup drive motor 96 attached to the attachment plate 95. A feed nut 100 fixed to one side of the optical pickup 90 is screwed to the feed screw shaft 99. The feed screw shaft 99 is rotatably supported to the attachment plate 95. A guide rail 101 is attached to the attachment plate 95 in parallel to the feed screw shaft 99. A bearing member 102 fixed to the other side of the optical pickup 90 is slidably engaged with the guide rail 101. The optical pickup 90 is movably held between the guide rail 101 and the feed screw shaft 99.

Therefore, when the feed screw shaft 99 is rotated by transmitting the rotation force of the pickup drive motor 96 to the reduction gear train 98, the optical pickup 90 is guided by the guide rail 101 and moved so as to approach or come away from the radius direction of the disk table 97. When this optical pickup 90 is moved, information recorded on the recording surface of the optical disk D is read out and the playback or the like is executed. The optical pickup 90 incorporates therein a laser diode serving as a light source, a plurality of optical devices such as a beam splitter or a collimator lens, a photodiode, etc.

A photosensor 110 for detecting the existence of the optical disk D (12 cm-CD in this embodiment) with a predetermined diameter stocked in the disk stocker portion 15 of the rotary table 8 is disposed outside the radius direction of the rotary table 8 and near the disk conveying mechanism 5. This photosensor 110 comprises a light-emitting portion 111 secured to the lower surface plate side of the box body 3a for emitting predetermined light and a light-receiving portion 112 secured to the upper surface plate side of the box body 3a for receiving the light emitted from the light-emitting portion 111. A light-emitting diode (LED), for example, may be applied to the light-emitting portion 111 of the photosensor 110, and a phototransistor, for example, may be applied to the light-receiving portion 112.

Figure 15:
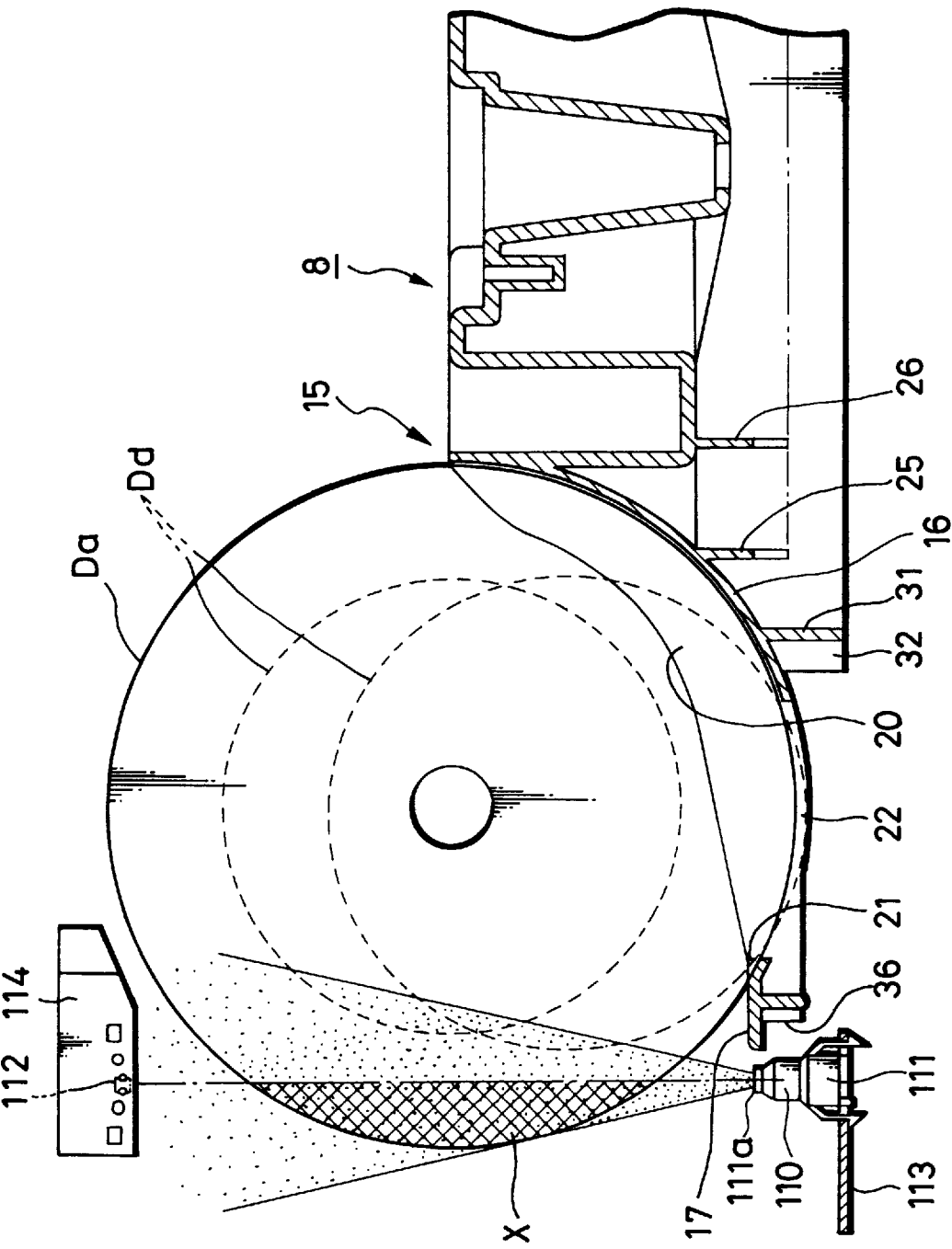
FIG. 15 is a side view used to explain the action of a photosensor of the disk reproducing apparatus.
Figure 16:
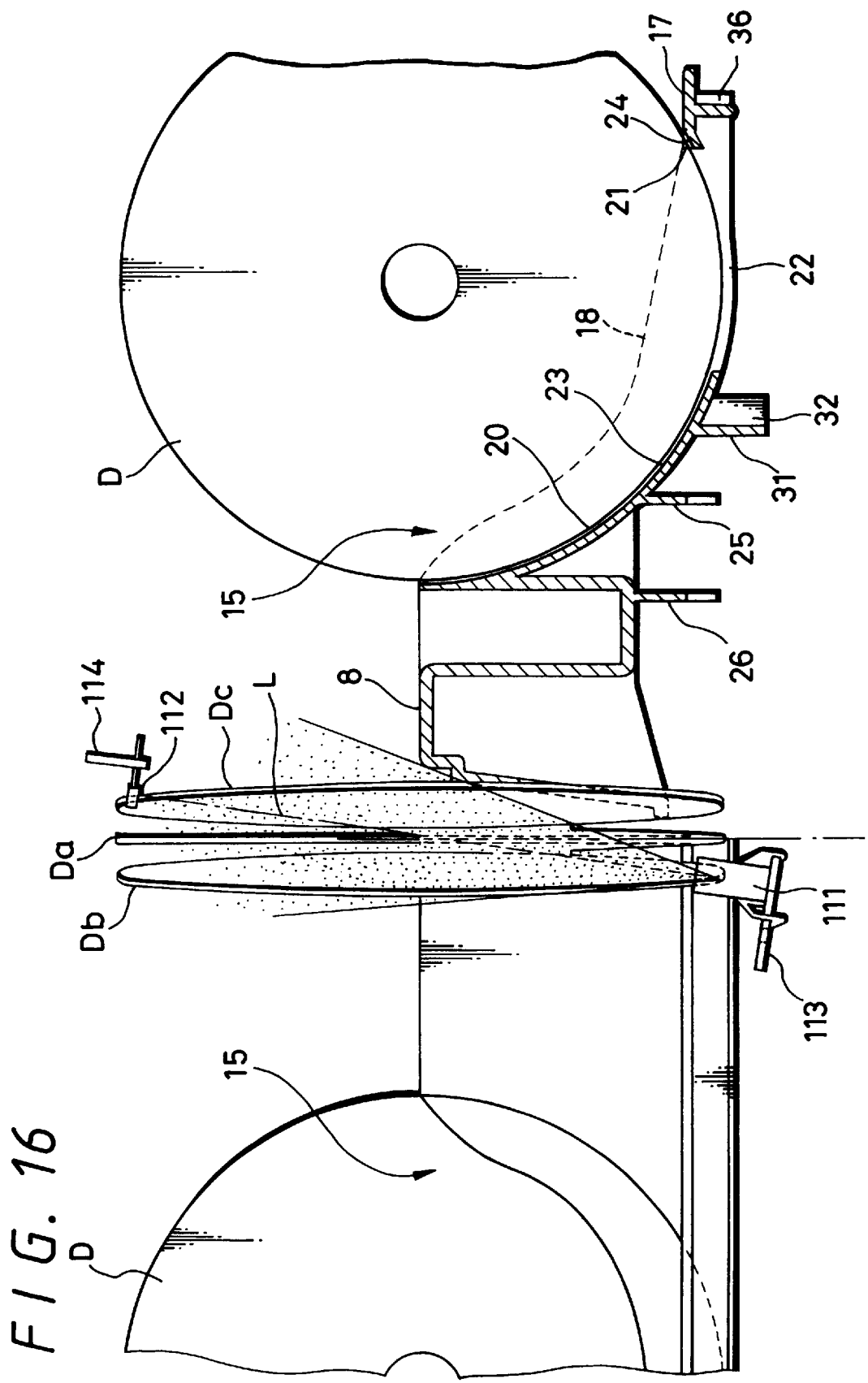
FIG. 16 is a front view used to explain the action of the photosensor of the disk reproducing apparatus.

As shown in FIGS. 15 and 16, the light-emitting portion 111 and the light-receiving portion 112 are disposed outside the radius direction of the rotary table 8 at the position in which they do not contact with the optical disk D, which is substantially vertically supported in the disk stocker portion 15 such that an optical axis L crosses the plane (vertical surface) of the optical disk D. As shown in FIG. 7, the light-emitting portion 111 is fixed to an attachment plate 113 such that its light-emitting opening 111a is oriented in the upper direction, and the attachment panel 113 is attached to the supporting member 40a formed on the base plate 40. The light-receiving portion 112 is fixed to an attachment plate 114, and the attachment plate 114 is attached to the upper bearing plate 10.

Figure 17:
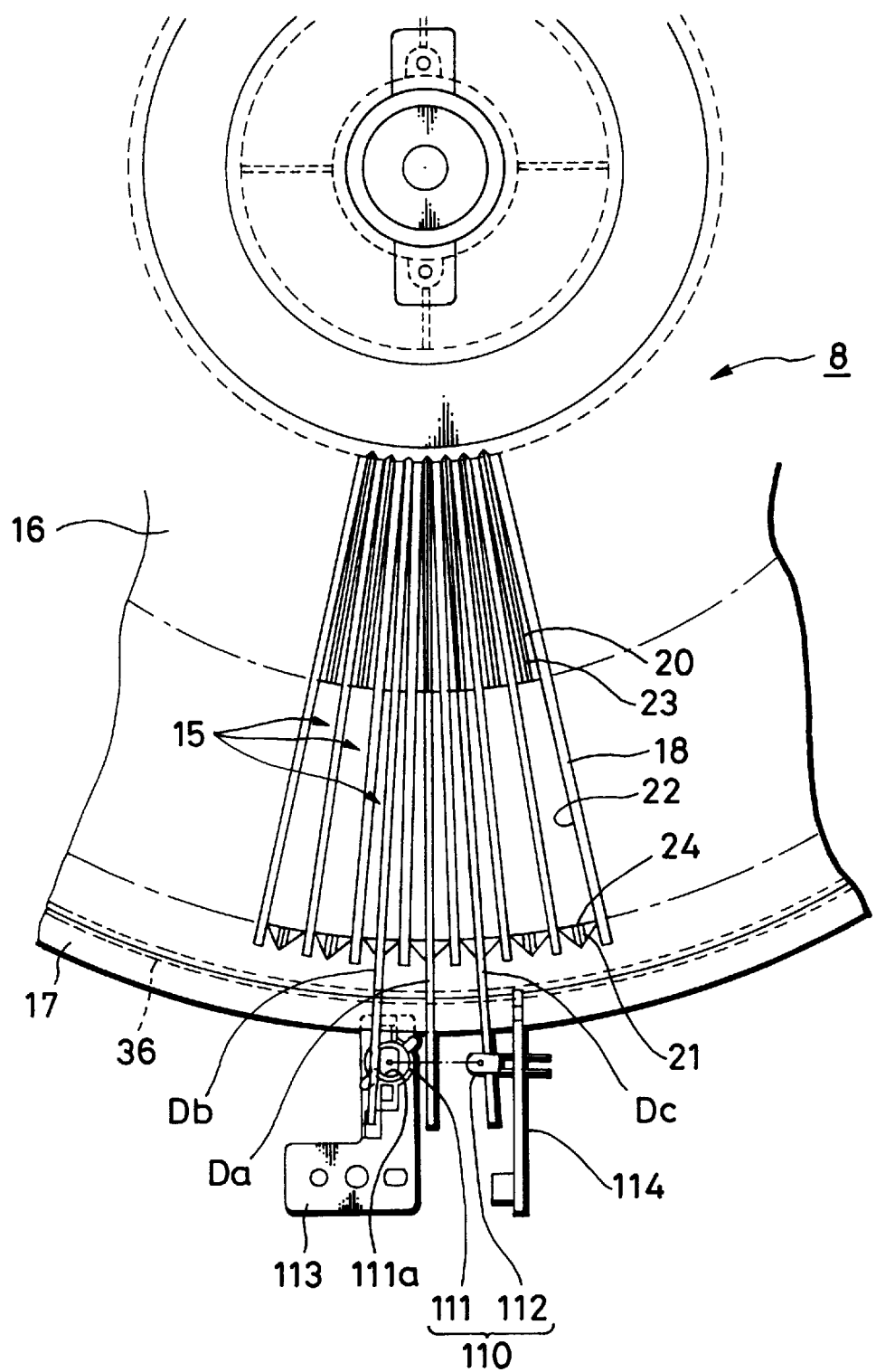
FIG. 17 is a plan view used to explain the action of the photosensor of the disk reproducing apparatus.

As shown in FIG. 17, the light-emitting opening 111a of the light-emitting portion 111 is deviated to one surface side by substantially one pitch so as to be located between an optical disk Db stocked in the adjacent disk stocker portion 15 and one surface side of an optical disk Da to be detected. On the other hand, the light-receiving portion 112 is deviated to the other surface side by substantially one pitch so as to be located between an optical disk Dc stocked in the adjacent disk stocker portion 15 and the other surface side of the detected optical disk Da, thereby giving the crossing angles to the light-emitting portion 111 and the light-receiving portion 112. In the case of this embodiment, the crossing angle of the optical axis L of the light-emitting portion 111 relative to the plane of the optical disk Da is about 9 degrees. The light-emitting opening 111a of the light-emitting portion 111 is made oblong in the radius direction of the rotary table 8, thereby suppressing light from being emitted in the circumferential direction of the rotary table 8, in other words, in the direction perpendicular to the plane of the optical disk Da.

In FIG. 7, reference numeral 103 denotes a disk cover disposed on the upper rear surface side of the opening portion 3c of the front panel 3b. The disk cover 103 is attached to the upper bearing plate 10 by screws through an attachment bracket 104. The disk cover 103 is formed arcuately so as to enable the optical disk D stocked in the disk stocker portion 15 of the rotary table 8 to pass therethrough in the horizontal direction. The disk cover 103 includes an annular disk supporting belt 105. The optical disk D is prevented from being unintentionally set free from the disk stocker portion 15.

The first and second arms 66, 68, the first and second conveying clicks 70, 73, the first and second L-shaped links 76, 78 and the cylindrical cam 50 constitute the disk conveying mechanism 5. The optical pickup 90, the frame plate 91, the disk table 97, the arm bracket 43 and the chucking plate 44 constitute the disk reproducing mechanism 6.

The disk reproducing apparatus thus arranged can select a desired optical disk D from a plurality of optical disks D and play the desired optical disk D as follows. Initially, optical disks D of a proper number are stocked in the disk stocker apparatus 4 disposed within the housing 3. In this embodiment, since the 100 disk stocker portions 15 are set on the rotary table 8 of the disk stocker apparatus 4 and one optical disk D can be stocked in each disk stocker portion 15, 100 optical disks D can be stocked in the disk stocker apparatus 4 at maximum at a time. The size of the optical disk D used is generally 12 cm and an 8 cm-optical disk can be used by use of an adapter, when necessary.

In this case, the optical disks D are stocked in the disk stocker portions 15 of the disk stocker apparatus 4 in a manual fashion. As shown in FIG. 2, the user opens the opening portion 3c by pulling the front door 3d disposed at the center of the front panel 3b thereby exposing the front side of the rotary table 8. Then, the user inserts the optical disk D into the opening portion 3c in the longitudinal direction and stocks the optical disk D into the disk stocker portion 15 placed at the front side of the rotary table 8. When a plurality of optical disks D are stocked, the user rotates the rotary table 8 in the right or left direction by turning the operation dial 19b disposed at the front surface of the disk reproducing apparatus in an arbitrary direction, and the user stocks the optical disk D in an empty disk stocker portion 15.

In this case, proper addresses from 1 to 100 are assigned to the 100 disk stocker portion 15. The controller (not shown) for controlling an operation of the disk reproducing apparatus controls the position of the rotary table 8 based on the proper address. Accordingly, when the optical disk D is reproduced, a relationship between the address of each disk stocker portion 15 of the disk stocker apparatus 4 and the optical disk D stocked in the disk stocker portion 15 corresponding to that address should be clarified in advance.

To this end, this kind of disk reproducing apparatus includes a memory device in which information can be written and erased freely. The user can enter information of a stocked optical disk D into this memory device at every address when the optical disk D is stocked. Information of optical disk D stocked in the memory device is displayed on the display portion 3e disposed on the front surface of the front panel 3b. In general, information concerning the optical disk D placed in front of the disk conveying mechanism 5 as well as conveyed by the conveying mechanism 5 from the disk stocker portion 15 is displayed on the display portion 3e.

When the optical disk D is stocked in the disk stocker portion 15 of the rotary table 8, in the case of this embodiment, the optical disks D are perpendicularly stocked in the disk stocker portions 15. If the optical disk D is inserted into the disk stocker portion 15 and the optical disk D is held by the inner receiving portion 20 of the inner supporting member 16 and the outer receiving portion 21 of the outer supporting member 17, then both outer peripheral edges of the outer peripheral surface of the optical disk D are pressed by the weight of the disk against both inclined surfaces of the V-like grooves 23, 24 because the V-like groove 23 is formed on the bottom surface of the inner receiving portion 20 and the V-like groove 24 is formed on the bottom surface of the outer receiving portion 21. The V-like groove 23 of the inner receiving portion 20 rises in a curve line fashion from the lower surface through the side surface to the upper surface of the optical disk D. Therefore, the side portions of the two V-like grooves 23, 24 prevent the optical disk D from falling while the lower portions of the V-like grooves 23, 24 support the weight of the optical disk D.

Therefore, the V-like grooves 23, 24 of the disk stocker portion 15 can reliably hold the two outer peripheral edges of the outer peripheral surface of the optical disk D and the optical disk D can be supported under the condition that the optical disk D is stocked in a substantially vertical direction. The V-like grooves 23, 24 can reliably hold the optical disk D similarly even when the thickness of the optical disk D is changed. If the thickness of the optical disk D falls within the range of the width W of the V-like grooves 23, 24, then regardless of the thickness of the optical disk D, both outer peripheral edges of the optical disk D are urged against the two inclined surfaces of the V-like grooves 23, 24 so that the optical disk D can be supported in substantially the vertical direction and held reliably without shaking the optical disk D.

According to this embodiment, since the 100 disk stocker portions 15 are radially arranged on the rotary table 8 along the same circumference, if the optical disks D are stocked in the disk stocker portions 15 and the optical disks D are supported in a doughnut fashion, then a spacing between adjacent optical disks D can be reduced as much as possible in the inside of the rotary table 8, whereby the space within the housing 3 can be reduced and the whole size of the disk reproducing apparatus can be miniaturized. On the other hand, since the optical disks D are radially extended from the outside of the rotary table 8 and the spacing between the adjacent optical disks D is increased in the outside of the radius direction, the sufficiently large spacing between the adjacent optical disks D can be maintained and hence the optical disks D can be prevented from contacting with each other.

A manner in which the optical disk D stocked in the disk stocker portion 15 of the rotary table 8 is extracted by the disk conveying mechanism 5 and loaded onto the disk reproducing mechanism 6 and thereby played will be described below. A conveying operation of the optical disk D is executed as follows.

In the initial state before this operation is started, as shown in FIGS. 7 and 8, the stopper pin 33 is placed at the retreated position by the operation of the stopper pin drive cam portion 56 of the cylindrical cam 50 and is not engaged with any of the lock recess portions 32 disposed on the lock plate 31 of the rotary table 8. Accordingly, the rotary table 8 is in the rotatable state. The rotary table drive cam portion 55 of the cylindrical cam 50 is brought in contact with the operation member 88a of the control switch 88, and the detected signal is inputted to the aforementioned controller (not shown). As shown in FIG. 6, while the first arm 66 is lowered and placed under the rotary table 8 by the operation of the arm drive cam 52 of the cylindrical cam 50, the second arm 68 is moved backward and placed under the chucking plate 44.

By the operation of the optical system drive cam portion 51 of the cylindrical cam 50, the rotary table 8 side of the frame plate 91 is a bit opened and the disk table 97 is detached from the chucking plate 44. On the other hand, since the cam pin 48 is not brought in contact with the disk guide drive cam portion 54, the guide link 47 is pushed downwardly under spring force of the spring 49, thereby causing the disk guide 45 to be placed in the lowered state.

In the above-mentioned state, after the disk reproducing apparatus is energized by operating the power-supply switch 19a shown in FIG. 2, the user selects an optical disk D that the user wishes to play and enters the address number of the disk stocker portion 15 in which the selected disk D is stocked by the operation switch 19c. In this case, the photosensor 110 constantly (or at every predetermined timing) detects whether or not the optical disk D is stocked in the disk stocker portion 15 of the rotary table 8 that is placed at the eject position of the optical disk D by the disk conveying mechanism 5. A detected signal from the photosensor 110 is inputted to the aforementioned controller.

Figure 10:
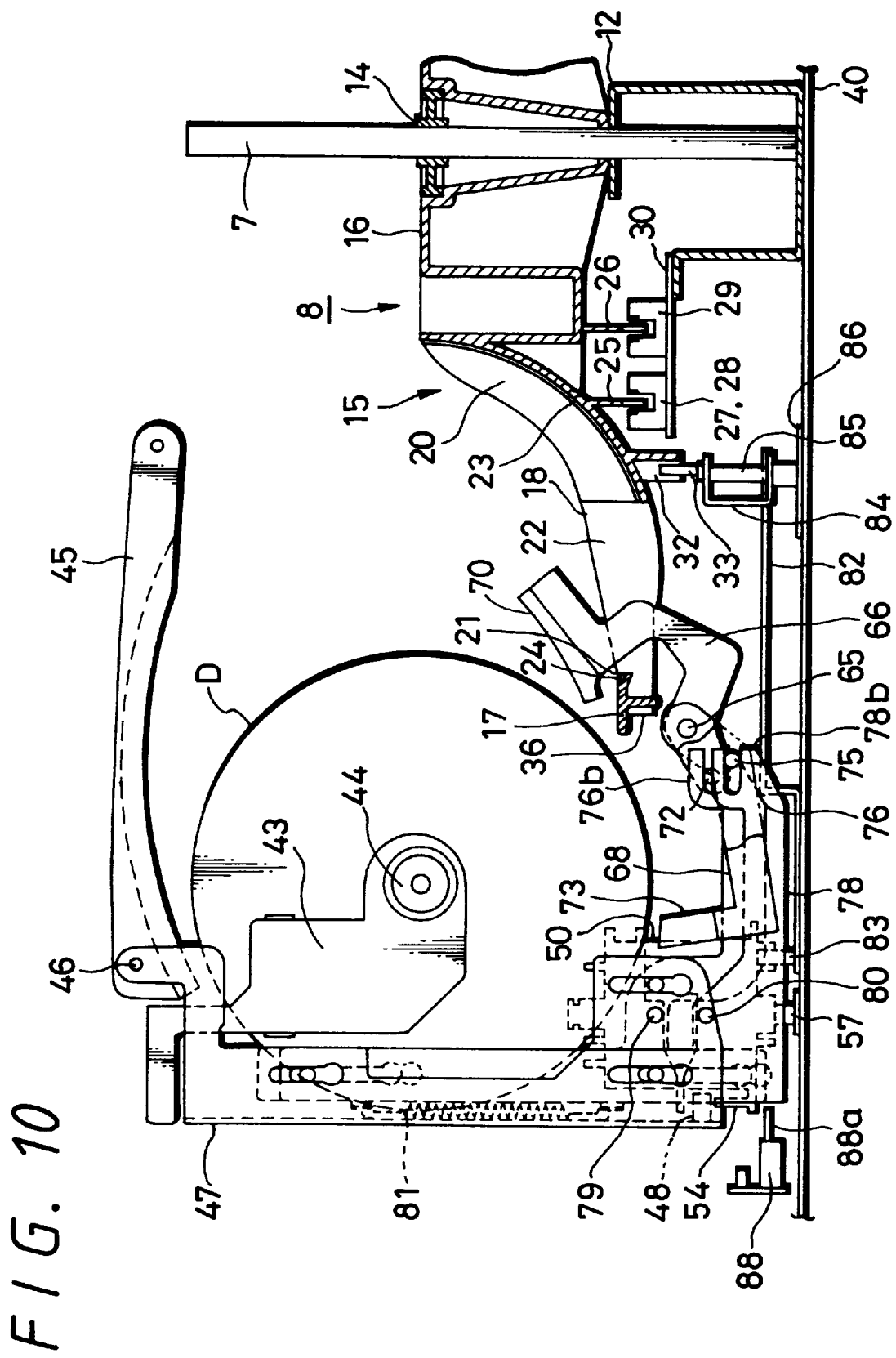
FIG. 10 is a diagram showing the manner in which the disk conveying mechanism of the disk reproducing apparatus is operated, and to which reference will be made in explaining the state that the disk conveying mechanism has finished conveying the optical disk.

As shown in FIGS. 8 through 10, when the light-emitting portion 111 of the photosensor 110 emits light, such light proceeds toward the light-receiving portion 112 opposed to the light-emitting portion 111 on the optical axis L within a range in which the light is restricted by the shape of the light-emitting opening 111a. At that time, if the optical disk Da exists in the disk stocker portion 15 placed at the eject position, as shown in FIG. 15, a light-blocking portion X placed outside the optical axis L of the optical disk Da blocks the proceeding of light so that the light is not received by the light-receiving portion 112. Therefore, the light-receiving portion 112 transmits the detected signal indicating that predetermined light is not received to the aforementioned controller. Based on the detected signal, the controller determines that the optical disk D is stocked in the disk stocker portion 15 placed at the eject position, and also determines based on the detected signals from the three photosensors 27, 28, 29 the address number of the disk stocker portion 15. These judged results are displayed on the display portion 3e of the front panel 3b.

On the other hand, if the optical disk D is not stocked in the disk stocker portion 15 placed at the eject position, then light from the light-emitting portion 111 is directly received by the light-receiving portion 112 so that the light-receiving portion 112 transmits a detected signal indicating that predetermined light is received to the aforementioned controller. Based on the above detected signal and the detected signals from the photosensors 27, 28 and 29, the controller determines that no optical disk D exists on the disk stocker portion 15 placed at the eject position. Also, the controller determines the address number and displays a judged result on the display portion 3e.

Therefore, with the photosensor 110, it is possible to immediately determine whether or not the optical disk D is stocked in the disk stocker portion 15 placed at the eject position. Accordingly, in the disk reproducing apparatus in which 100 optical disks D are stocked at a time according to the present invention, a target optical disk D can be easily found from the thus stocked optical disks D in a short period of time and desired music can be reproduced rapidly. In addition, since the optical axis of the photosensor 110 is disposed at the outer peripheral portion of the rotary table 8, the photosensor 110 is prevented from detecting the optical disk Dd (e.g., 8-cm CD, etc.) with a diameter smaller than the target optical disk D. Therefore, according to this photosensor 110, only the optical disk of the target size can be detected.

Since the optical axes L of the light-emitting portion 111 and the light-receiving portion 112 are crossed on the plane of the optical disk D and not only light directly inputted but also reflected light are received when light becomes incident on the optical disk D, the photosensor 110 can be made by using an inexpensive photoelectric conversion element such as a light-emitting diode or phototransistor. Since the photosensor 110 is the optical sensor, the photosensor 110 does not produce a noise unlike a mechanical sensor and the disk reproducing apparatus can be kept silent.

The user can rotate the rotary table 8 by turning the operation dial 19b in a manual fashion. Also in this case, the address number of the disk stocker portion 15 moved to the eject position is displayed on the display portion 3e. In this case, it is possible for the user to visually confirm the contents of the optical disk D by watching the label of the optical disk D stocked in the disk stocker portion 15 opposed to the opening portion 3c when the front door 3d is opened.

A selection signal of the optical disk D thus selected is inputted to the aforementioned controller, whereby the controller successively outputs predetermined control signals to control the table drive motor 38 and the cam drive motor 62. The controller supplies a drive current to the table drive motor 38 of the table drive mechanism 9 to transmit a rotation force of the rotary shaft through the drive belt 39 and the reduction gear train 37 to the gear portion 36 of the rotary table 8, thereby rotating the rotary table 8 until the disk stocker portion 15 in which the selected optical disk D is stocked is moved to the unloading position disposed at the front portion of the disk conveying mechanism 5.

When a desired disk stocker portion 15 is opposed to the front portion of the disk conveying mechanism 5 in accordance with the rotation of the rotary table 8, the controller supplies a drive current to the cam drive motor 62 to rotate the rotary shaft of the cam drive motor 62, whereby a rotation force of the rotary shaft is transmitted to the gear portion 53 of the cylindrical cam 50 through the drive belt 63 and the reduction gear train 61 thereby rotating the cylindrical gear 50 in one direction (e.g., positive direction). Thus, the cam pin 83 engaged with the stopper pin drive cam portion 56 is moved toward the rotation center side of the cylindrical cam 50 to move the slide lever 82 in the backward direction, whereby the swing lever 84 is swung around the rotary shaft 85 to swingably move the stopper pin 33 toward the rotary table 8 side. As a result, as shown in FIG. 9, the stopper pin 33 is fitted into the lock recess portion 32 corresponding to the selected disk stocker portion 15 thereby locking the rotary table 8 at a desired position.

Shortly after the stopper pin 33 is moved, owing to the action of the arm drive cam portion 52, the slide pin 72 fixed to the first L-shaped link 76 which is spring-biased to the upper surface of the cam portion 52 and the slide pin 75 fixed to the second L-shaped link 78 which is spring-biased to the lower surface of the cam portion 52 are moved so as to narrow a spacing therebetween, i.e., while the upper slide pin 72 is lowered and the lower slide pin 75 is elevated. Thus, while the bifurcated portion 76 disposed at the tip end of the horizontal portion 76a of the first L-shaped link 76 lowers the slide pin 72 slidably engaged with the bifurcated portion 76b, the bifurcated portion 78b disposed at the tip end of the horizontal portion 78a of the second L-shaped link 78 elevates the slide pin 75.

As a result, in FIGS. 7 and 8, the first arm 66 is rotated around the rotary shaft 65 in the counter-clockwise direction and the second arm 68 is rotated around the rotary shaft 65 in the clockwise direction. As shown in FIG. 11, the first conveying click 70 formed at the tip end of the first arm 66 enters the operation opening 22 of the selected disk stocker portion 15 of the rotary table 8 from the lower direction to elevate the optical disk D stocked within the disk stocker portion 15, thereby extracting the optical disk D from the disk stocker portion 15. Also, the second conveying click 73 formed at the tip end of the second arm 68 is moved so as to receive the optical disk D, whereby the two conveying clicks 70, 73 hold the optical disk D in the diameter direction. When the cylindrical cam 50 is rotated in the positive direction, only the rotation direction of the second arm 68 is reversed and the first and second conveying clicks 70, 73 are rotated in the counter-clockwise direction in cooperation with each other.

The first and second arms 66, 68 are rotated as described above, whereby the optical disk D is guided by the disk guide 45 and conveyed to the disk reproducing mechanism 6 side. When the optical disk D is held and moved by the first and second conveying clicks 70, 73 to a predetermined chucking position, the opening side of the frame plate 91 is closed by the optical system drive cam portion 51, whereby the disk table 97 that is rotatably supported on the frame plate 91 is brought in parallel to the chucking plate 44 held on the stand plate 41. As a consequence, the chucking plate 44 is attracted to the disk table 97 across the optical disk D by a magnetic force of the magnet fixed to the chucking plate 44. Therefore, as shown in FIG. 10, the optical disk D is rotatably supported to the disk table 97 and the chucking operation of the optical disk D is completed.

At the completion of the chucking operation, as shown in FIG. 10, the second arm 68 is further rotated in the counter-clockwise direction to the extent that the second conveying click 73 comes away from the optical disk D. On the other hand, the first arm 66 is further rotated in the clockwise direction to the extent that the first conveying click 70 comes away from the optical disk D. Concurrently therewith, the cam pin 48 fixed to the guide link 47 is elevated by the disk guide drive cam portion 54 and the guide link 47 is lifted by an amount corresponding to the lifted amount of the guide pin 48 with the result that the outer end of the optical disk D is elevated so as to be detached from the disk guide by the engagement pin 46 fixed to the guide link 47. Thus, a preparation for playing the optical disk D is completed.

The reason that the first and second conveying clicks 70, 73 and the disk guide 45 are spaced apart from the optical disk D by the proper amounts is to prevent the optical disk D from contacting the first conveying click 70 or the like even when the optical disk D is twisted and rotated by extra vibrations during its rotation.

Thereafter, if the user operates the operation switches 19c, then the controller outputs a control signal for playback in response to the operated switch to drive the spindle motor, thereby rotating the optical disk D loaded on the disk plate 97. Also, the pickup drive motor 96 is driven to move the optical pickup 90 in the radius direction of the optical disk D. At that time, the optical pickup 90 reads out information from the information recording surface of the optical disk D and the apparatus plays back the optical disk D based on the information thus read.

After the playback of the desired optical disk D has been finished, the controller outputs control signals for rotating the cam drive motor 62 and the table drive motor 38 in the opposite directions thereby to execute the conveying operation for return the optical disk D into the disk stocker apparatus 4. Initially, the controller outputs a control signal for rotating the cam drive motor 62 in the direction opposite to the direction in which the cam drive motor 62 is rotated when the optical disk D is extracted from the disk stocker apparatus 4, thereby rotating the cylindrical cam 50 in the reverse direction opposite to the positive direction. Therefore, from the state shown in FIG. 10, the guide link 47 is lowered through the cam pin 48 in accordance with the rotation of the disk guide drive cam portion 54 of the cylindrical cam 50, whereby the engagement pin 46 integrally formed with the guide link 47 is lowered and the outer end of the disk guide 45 is lowered to approach above the optical disk D.

At the same time, when the arm drive cam portion 52 of the cylindrical cam 50 is rotated, the upper and lower cam pins 79, 80 are elevated and lowered in the upper and lower direction, whereby the upper cam pin 79 is lowered to lower the first L-shaped link 76 and the lower cam pin 80 is raised to elevate the second L-shaped link 78. Therefore, in FIG. 10, the first arm 66 is rotated in the counter-clockwise direction and the first conveying click 70 approaches the optical disk D to support the optical disk D from the front side. Also, the second arm 68 is rotated in the clockwise direction and the second conveying click 73 approaches the optical disk D to support the optical disk D from the rearward.

After a little while, when the optical system drive cam portion 51 is rotated, the cam pin 92 is moved to the pivot shaft 57 side which supports the cylindrical cam 50 thereby opening the rotary table 8 side of the frame plate 91. Thus, the disk table 97 is detached from the chucking plate 44 against the attracting force of the magnet and the optical disk D is released, thereby releasing the disk from the loading state. Consequently, the optical disk D is supported at its front and rear lower portions by the first conveying click 70 and the second conveying click 73 and also is guided at its upper portion by the disk guide 45.

Further, when the cylindrical cam 50 is rotated in the reverse direction, the upper cam pin 79 is lowered and the upper cam pin 80 is elevated in accordance with the rotation of the arm drive cam portion 52, whereby the first L-shaped link 76 and the second L-shaped link 78 are both elevated. Thus, as shown in FIG. 9, the first arm 66 and the second arm 68 are both rotated around the rotary shaft 65 in the clockwise direction. As a result, as shown in FIG. 8, the optical disk D is moved along the disk guide 45 toward the rotary table 8 side. The first conveying click 70 is moved through the operation opening 22 of the disk stocker portion 15 to the underside of the rotary table 8, whereby the optical disk D is returned into the original disk stocker portion 15.

Concurrently therewith, the slide lever 82 is pushed forward in accordance with the rotation of the rotary table drive cam portion 55, whereby the stopper pin 33 is moved backward as the swing lever 82 is swung, thereby releasing the engagement between the stopper pin 33 and the lock recess portion 32. Thus, the rotary table 8 is placed in the rotatable state and the disk reproducing apparatus becomes able to play back the next optical disk D.

While the present invention is applied to the recording medium stocker apparatus using the preformatted optical disk D as the disk-like recording medium and which includes the rotary table in which a good number of optical disks D are arranged in the circumferential direction and stocked at a time and the disk reproducing apparatus including the above rotary table, the present invention is not limited thereto and the principle of the present invention may be applied to a disk recording and/or reproducing apparatus using a write once magneto-optical disk in which information can be written once and a rewritable magneto-optical disk in which information can be written repeatedly so as to be able to not only reproduce recorded information but also to record information.

While the V-like groove is the groove whose cross section is true V-shape as described above, the present invention is not limited thereto and a groove whose cross section is an inverted trapezoid may be applied to the above-mentioned groove.

While the disk stocker apparatus according to the present invention comprises the rotary table and the disk stocker portions radially disposed on the rotary table as described above, the present invention is not limited thereto and the principle of the present invention may be applied to a disk stocker apparatus in which a stocker is formed as a rectangular housing including disk stocker portions and this stocker is slidably moved back and forth.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A recording and/or reproducing apparatus for a disk-like recording medium comprising:

a stocker portion for stocking therein a plurality of disk-like recording media, said stocker portion having a plurality of recess portions in which said plurality of disk-like recording media are stocked, said plurality of recess portions being disposed radially on said stocker portion, and each said recess portion having a substantially V-like cross section at a portion contacting an outer peripheral edge portion of said disk-like recording medium;

a rotary drive mechanism for rotating said stocker portion;

an inhibiting mechanism for inhibiting said stocker portion from being rotated by said rotary drive mechanism;

a recording and/or reproducing mechanism for recording and/or reproducing said disk-like recording medium;

a conveying mechanism for extracting a desired disk-like recording medium from said stocker portion rotated by said rotary drive mechanism, conveying said desired disk-like recording medium to said recording and/or reproducing mechanism, extracting said disk-like recording medium from said recording and/or reproducing mechanism, and conveying said extracted disk-like recording medium to said stocker portion;

head means for recording and/or reproducing said disk-like recording medium held by first and second arm portions;

driving means for driving said conveying mechanism and said first and second arm portions, wherein said driving means includes a cam member comprising a first cam portion for driving said conveying mechanism, a second cam portion for driving said first and second arm portions and a third cam portion for switching said inhibiting mechanism; and disk presence detecting means for detecting a presence of said disk-like recording medium stocked in said stocker portion by irradiating a light beam in a direction that crosses a surface of said disk-like recording medium stocked in said stocker portion, wherein said disk presence detecting means includes a light source fixed in a lower portion of said recording and/or reproducing apparatus and a light-receiving device fixed in an upper portion of said recording and/or reproducing apparatus for receiving a light beam from said light source, said light source and said light-receiving device being disposed so that a straight line connecting said light source and said light-receiving device forms an acute angle with the surface of said disk-like recording medium stocked in said stocker portion.

2. A recording and/or reproducing apparatus for a disk-like recording medium as claimed in claim 1, wherein each of said plurality of recess portions of said stocker portion has an opening portion defined therein and said conveying mechanism includes said first arm portion inserted through said opening portion and said second arm portion for conveying said disk-like recording medium by holding the outer peripheral edge portion of said disk-like recording medium at a receiving portion together with said first arm portion inserted through said opening portion.

3. A recording and/or reproducing apparatus for a disk-like recording medium as claimed in claim 2, wherein said conveying mechanism further includes a guide portion disposed at a position opposing said first and second arm portions for conveying said disk-like recording medium together with said first and second arm portions.

4. A recording and/or reproducing apparatus for a disk-like recording medium as claimed in claim 3, wherein said first and second arm portions and said guide portion convey said disk-like recording medium from said stocker portion to said recording and/or reproducing means and release the holding of said disk-like recording medium when said disk-like recording medium is held by said recording and/or reproducing means.

5. A recording and/or reproducing apparatus for a disk-like recording medium as claimed in claim 2, wherein said first and second arm portions have substantially V-like cross sections at respective portions for holding said disk-like recording medium.

6. A recording and/or reproducing apparatus for a disk-like recording medium as claimed in claim 1, wherein said inhibiting mechanism is switched between a state such that said driving means inhibits said stocker portion from being rotated by said rotary drive mechanism and a state such that said rotary drive mechanism rotates said stocker portion.

7. A recording and/or reproducing apparatus for a disk-like recording medium as claimed in claim 1, wherein said recess portion is formed as an arcuate recess portion having at respective ends a plurality of receiving portions each having a substantially V-like cross section.

8. A recording and/or reproducing apparatus for a disk-like recording medium according to claim 1, further comprising position detecting means for detecting a rotational position of said stocker portion and control means for controlling said rotary drive mechanism based on an output from said position detecting means.

9. A recording and/or reproducing apparatus for a disk-like recording medium comprising:

a stocker portion for stocking therein a plurality of disk-like recording media, said stocker portion having a plurality of recess portions in which said plurality of disk-like recording media are stocked, said plurality of recess portions being disposed radially on said stocker portion, and each said recess portion having a substantially V-like cross section at a portion contacting an outer peripheral edge portion of said disk-like recording medium;

a rotary drive mechanism for rotating said stocker portion;

a recording and/or reproducing mechanism for recording and/or reproducing said disk-like recording medium;

a conveying mechanism for extracting a desired disk-like recording medium from said stocker portion rotated by said rotary drive mechanism, conveying said desired disk-like recording medium to said recording and/or reproducing mechanism, extracting said disk-like recording medium from said recording and/or reproducing mechanism, and conveying said extracted disk-like recording medium to said stocker portion;

position detecting means for detecting a rotational position of said stocker portion and control means for controlling said rotary drive mechanism based on an output from said position detecting means; and disk presence detecting means for detecting a presence of said disk-like recording medium stocked in said stocker portion by irradiating a light beam in a direction that crosses a surface of said disk-like recording medium stocked in said stocker portion, wherein said disk presence detecting means includes a light source fixed in a lower portion of said recording and/or reproducing apparatus and a light-receiving device fixed in an upper portion of said recording and/or reproducing apparatus for receiving a light beam from said light source, said light source and said light-receiving device being disposed so that a straight line connecting said light source and said light-receiving device forms an acute angle with the surface of said disk-like recording medium stocked in said stocker portion.

10. A recording and/or reproducing apparatus for a disk-like recording medium comprising:

a stocker portion for stocking therein a plurality of disk-like recording media, said stocker portion having a plurality of recess portions in which said plurality of disk-like recording media are respectively stocked, said plurality of recess portions being disposed radially on said stocker portion, and each said recess portion having a substantially V-like cross section at a portion contacting an outer peripheral edge portion of said disk-like recording medium;

a rotary drive mechanism for rotating said stocker portion;

a recording and/or reproducing mechanism for recording and/or reproducing said disk-like recording medium;

a conveying mechanism for extracting a desired disk-like recording medium from said stocker portion rotated by said rotary drive mechanism, conveying said desired disk-like recording medium to said recording and/or reproducing mechanism, extracting said disk-like recording medium from said recording and/or reproducing mechanism, and conveying said extracted disk-like recording medium to said stocker portion;

a housing for housing said stocker portion, said rotation drive mechanism, said recording and/or reproducing mechanism, and said conveying mechanism, said housing having an opening portion through which said stocker portion is partly exposed;

operation means for controlling said rotary drive mechanism to rotate said stocker portion when said stocker portion is exposed through said opening portion; and disk presence detecting means for detecting a presence of said disk-like recording medium stocked in said stocker portion by irradiating a light beam in a direction that crosses a surface of said disk-like recording medium stocked in said stocker portion, wherein said disk presence detecting means includes a light source fixed in an upper portion of said recording and/or reproducing apparatus and a light-receiving device fixed in an upper portion of said recording and/or reproducing apparatus for receiving a light beam from said light source being disposed so that a straight line connecting said light source and said light-receiving device forms an acute angle with the surface of said disk-like recording medium stocked in said stocker portion.

11. A recording and/or reproducing apparatus for a disk-like recording medium according to claim 10, further comprising position detecting means for detecting a rotational position of said stocker portion and wherein said operation means controls an operation of said rotary drive mechanism based on an output from said position detecting means.

12. A recording and/or reproducing apparatus for a disk-like recording medium as claimed in claim 11, wherein said stocker portion includes a plurality of detection members for detecting a position of each said plurality of recess portions and said position detecting means includes a light source and a light-receiving device disposed across said detecting members.

13. A recording and/or reproducing apparatus for a disk-like recording medium as claimed in claim 10, wherein said recess portion of said stocker portion has an opening portion and said conveying mechanism has a first arm portion inserted into said opening portion and a second arm portion for conveying said disk-like recording medium by holding said disk-like recording medium at said outer peripheral edge portion together with said first arm portion.

14. A recording and/or reproducing apparatus for a disk-like recording medium as claimed in claim 13, wherein said conveying mechanism includes a guide portion disposed at a position opposing said first and second arm portions for conveying said disk-like recording medium together with said first and second arm portions.

* * * * *